(12) United States Patent
Hollis et al.

(10) Patent No.: US 10,183,731 B2
(45) Date of Patent: Jan. 22, 2019

(54) UNDERWATER WARNINGS

(71) Applicant: Pelagic Pressure Systems Corp., San Leandro, CA (US)

(72) Inventors: Robert R. Hollis, San Leandro, CA (US); John E. Lewis, Rancho Palos Verdes, CA (US)

(73) Assignee: Pelagic Pressure Systems Corp., San Leandro, CA (US)

( * ) Notice: Subject to any disclaimer, the term of this patent is extended or adjusted under 35 U.S.C. 154(b) by 0 days.

(21) Appl. No.: 15/484,008

(22) Filed: Apr. 10, 2017

(65) Prior Publication Data

US 2017/0217551 A1 Aug. 3, 2017

Related U.S. Application Data

(60) Continuation of application No. 14/635,747, filed on Mar. 2, 2015, now Pat. No. 9,616,982, which is a (Continued)

(51) Int. Cl.
*B63C 11/26* (2006.01)
*G01S 19/14* (2010.01)
(Continued)

(52) U.S. Cl.
CPC .............. *B63C 11/26* (2013.01); *G01L 19/00* (2013.01); *G01S 19/14* (2013.01); *B63B 2213/02* (2013.01); *B63C 2011/021* (2013.01)

(58) Field of Classification Search
CPC ................ B63B 2213/02; B63C 11/26; B63C 2011/021; G01S 19/19; G01S 19/14; G01L 19/00

See application file for complete search history.

(56) References Cited

U.S. PATENT DOCUMENTS 3,469,231 A 9/1969 Geiling et al.
3,813,687 A 5/1974 Geil
(Continued)

FOREIGN PATENT DOCUMENTS

GB 1421928 1/1976
JP 2976813 B 11/1999
(Continued)

OTHER PUBLICATIONS

Alameda, Jr., et al., "SEADeViL a Totally Integrated Inertial Navigation System (INS) Solution", Underwater Intervention Symposium, 2002, New Orleans, Feb. 27-Mar. 2, 2002, pp. 1-6., 2002.
(Continued)

*Primary Examiner* — Robert Deberadinis
(74) *Attorney, Agent, or Firm* — KPPB LLP

(57) ABSTRACT

Dive computers in accordance with embodiments of the invention are disclosed. One embodiment includes a mobile phone handset, including a microprocessor, a microphone connected to the microprocessor, a speaker connected to the microprocessor, a telephone transceiver connected to the microprocessor, memory, a display, and an external connector for communicating with external devices wherein the memory contains a software application, and a waterproof housing including a pressure transducer, where the mobile phone handset is located within the waterproof housing and connected to the pressure transducer via the external connector, and wherein the software application configures the mobile phone handset to create a dive log stored in memory, wherein the dive log comprises recorded information including depth of submersion information recorded from the pressure transducer and display the recorded information during the dive.

20 Claims, 23 Drawing Sheets

Related U.S. Application Data continuation of application No. 13/465,480, filed on May 7, 2012, now Pat. No. 9,013,349, which is a continuation of application No. 12/246,408, filed on Oct. 6, 2008, now Pat. No. 8,174,436, and a continuation-in-part of application No. 12/170,871, filed on Jul. 10, 2008, which is a division of application No. 11/264,290, filed on Oct. 31, 2015, which is a continuation of application No. 10/615,635, filed on Jul. 8, 2003, now Pat. No. 6,972,715.

(60) Provisional application No. 60/977,749, filed on Oct. 5, 2007, provisional application No. 60/394,982, filed on Jul. 8, 2002.

(51) Int. Cl.
*G01L 19/00* (2006.01)
*B63C 11/02* (2006.01)

(56) References Cited

U.S. PATENT DOCUMENTS

| | | |
|---|---|---|
| 3,898,883 A | 8/1975 | Kozak |
| 3,995,578 A | 12/1976 | McCullough et al. |
| 4,107,995 A | 8/1978 | Ligman et al. |
| 4,315,326 A | 2/1982 | Chase, Jr. |
| 4,563,758 A | 1/1986 | Paternostro |
| 4,586,136 A | 4/1986 | Lewis |
| 4,635,242 A | 1/1987 | Hart |
| 4,682,363 A | 7/1987 | Goldfarb et al. |
| 4,683,587 A | 7/1987 | Silverman |
| 4,999,606 A | 3/1991 | Comerford et al. |
| 5,010,529 A | 4/1991 | Maynus |
| 5,033,818 A | 7/1991 | Barr |
| 5,148,412 A | 9/1992 | Suggs |
| 5,156,055 A | 10/1992 | Hollis et al. |
| 5,161,828 A | 11/1992 | Hynes et al. |
| 5,191,317 A | 3/1993 | Toth et al. |
| 5,301,668 A | 4/1994 | Hales |
| 5,331,602 A | 7/1994 | McLaren |
| 5,500,806 A | 3/1996 | Bellin et al. |
| 5,512,941 A | 4/1996 | Takahashi et al. |
| 5,523,982 A | 6/1996 | Dale |
| 5,570,323 A | 10/1996 | Prichard et al. |
| 5,570,688 A | 11/1996 | Cochran et al. |
| 5,685,722 A | 11/1997 | Taba |
| 5,747,700 A | 5/1998 | Wood et al. |
| 5,798,733 A | 8/1998 | Ethridge |
| 5,850,626 A | 12/1998 | Kallio |
| 5,899,204 A | 5/1999 | Cochran |
| 5,956,291 A | 9/1999 | Nehemiah et al. |
| 5,995,882 A | 11/1999 | Patterson et al. |
| 6,032,108 A | 2/2000 | Seiple et al. |
| 6,054,929 A | 4/2000 | Garofalo et al. |
| 6,121,881 A | 9/2000 | Bieback et al. |
| 6,125,080 A | 9/2000 | Sonnenschein et al. |
| 6,272,073 B1 | 8/2001 | Doucette et al. |
| 6,319,079 B1 | 11/2001 | Cooper |
| 6,360,182 B1 | 3/2002 | Hales |
| 6,390,640 B1 | 5/2002 | Wong et al. |
| 6,396,769 B1 | 5/2002 | Polany |
| 6,519,548 B1 | 2/2003 | Kuroda et al. |
| 6,525,762 B1 | 2/2003 | Mileski et al. |
| 6,543,444 B1 | 4/2003 | Lewis |
| 6,549,850 B2 | 4/2003 | Punkka et al. |
| 6,686,360 B2 | 2/2004 | Labidalle et al. |
| 6,701,252 B2 | 3/2004 | Brown |
| 6,712,017 B2 | 3/2004 | Harrie et al. |
| 6,734,808 B1 | 5/2004 | Michaelson et al. |
| 6,769,508 B1 | 8/2004 | O'Connor |
| 6,791,490 B2 | 9/2004 | King |
| 6,807,127 B2 | 10/2004 | McGeever, Jr. |
| 6,837,240 B1 | 1/2005 | Olstad et al. |
| 6,842,402 B2 | 1/2005 | Germiquet et al. |
| 6,856,578 B2 | 2/2005 | Magine et al. |
| 6,931,348 B2 | 8/2005 | Furuta et al. |
| 6,941,226 B2 | 9/2005 | Estep |
| 6,972,715 B2 | 12/2005 | Hollis et al. |
| 6,977,671 B1 | 12/2005 | Kitson et al. |
| 7,047,114 B1 | 5/2006 | Rogers |
| 7,139,647 B2 | 11/2006 | Larsen |
| 7,144,198 B2 | 12/2006 | Hirose et al. |
| 7,268,703 B1 | 9/2007 | Kabel et al. |
| 7,310,549 B1 | 12/2007 | Angelini et al. |
| 7,383,150 B2 | 6/2008 | Angelini et al. |
| 7,535,799 B2 | 5/2009 | Polany et al. |
| 7,698,091 B2 | 4/2010 | Claude |
| 7,797,124 B2 | 9/2010 | Hollis et al. |
| RE42,218 E | 3/2011 | Magine et al. |
| 8,009,516 B2 | 8/2011 | Crowell |
| 8,174,436 B2 | 5/2012 | Hollis et al. |
| 8,600,701 B2 | 12/2013 | Hollis et al. |
| 8,847,818 B2 | 9/2014 | Hollis et al. |
| 9,013,349 B2 | 4/2015 | Hollis et al. |
| 9,043,128 B2 | 5/2015 | Hollis |
| 9,254,900 B2 | 2/2016 | Hollis et al. |
| 9,443,039 B2 | 9/2016 | Hollis et al. |
| 9,616,982 B2 | 4/2017 | Hollis et al. |
| 9,733,227 B2 | 8/2017 | Hollis et al. |
| 9,813,678 B2 | 11/2017 | Hollis |
| 9,821,893 B2 | 11/2017 | Hollis |
| 2002/0013535 A1 | 1/2002 | Nissila et al. |
| 2002/0140599 A1 | 10/2002 | King |
| 2002/0176323 A1 | 11/2002 | Magine et al. |
| 2003/0115010 A1 | 6/2003 | Estep |
| 2003/0135326 A1 | 7/2003 | Brown |
| 2004/0022129 A1 | 2/2004 | McGeever, Jr. et al. |
| 2004/0046710 A1 | 3/2004 | Adams et al. |
| 2004/0068371 A1 | 4/2004 | Estep et al. |
| 2004/0068731 A1 | 4/2004 | Davis et al. |
| 2004/0196180 A1 | 10/2004 | Hollis et al. |
| 2005/0033509 A1 | 2/2005 | Clapper |
| 2005/0248444 A1 | 11/2005 | Joao |
| 2006/0064242 A1 | 3/2006 | Litvack et al. |
| 2006/0066477 A1 | 3/2006 | Hollis et al. |
| 2007/0006472 A1 | 1/2007 | Bauch |
| 2007/0099726 A1 | 5/2007 | Rife et al. |
| 2008/0185001 A1 | 8/2008 | McWilliams |
| 2009/0014624 A1 | 1/2009 | Blees et al. |
| 2009/0018771 A1 | 1/2009 | Hollis |
| 2009/0090199 A1 | 4/2009 | Hollis et al. |
| 2009/0135022 A1 | 5/2009 | Hollis et al. |
| 2010/0167608 A1 | 7/2010 | Daye et al. |
| 2010/0302233 A1 | 12/2010 | Holland |
| 2011/0055746 A1 | 3/2011 | Mantovani et al. |
| 2011/0096633 A1 | 4/2011 | Sonnenschein et al. |
| 2011/0188349 A1 | 8/2011 | Basilico et al. |
| 2011/0196643 A1 | 8/2011 | Hollis et al. |
| 2012/0220317 A1 | 8/2012 | Hollis et al. |
| 2013/0027541 A1 | 1/2013 | Hollis et al. |
| 2013/0144558 A1 | 6/2013 | Hollis et al. |
| 2014/0044154 A1 | 2/2014 | Wolfe et al. |
| 2015/0067580 A1 | 3/2015 | Um et al. |
| 2015/0071039 A1 | 3/2015 | Rahkonen et al. |
| 2015/0175248 A1 | 6/2015 | Hollis et al. |
| 2015/0181176 A1 | 6/2015 | Hollis |
| 2016/0041269 A1 | 2/2016 | Lewis et al. |
| 2016/0068242 A1 | 3/2016 | Govoni et al. |
| 2016/0080888 A1 | 3/2016 | Hollis et al. |
| 2016/0096601 A1 | 4/2016 | Hollis |
| 2016/0231300 A1 | 8/2016 | Hollis et al. |
| 2017/0066515 A1 | 3/2017 | Hollis et al. |
| 2017/0307577 A1 | 10/2017 | Hollis et al. |
| 2018/0050775 A1 | 2/2018 | Hollis |
| 2018/0199010 A1 | 7/2018 | Hollis |

FOREIGN PATENT DOCUMENTS

| | | |
|---|---|---|
| WO | 9817526 | 4/1998 |
| WO | 9845969 | 10/1998 |

(56) References Cited

FOREIGN PATENT DOCUMENTS

WO        1999006798 A1    2/1999
WO           0055676       9/2000

OTHER PUBLICATIONS

Author Unknown, "DiveBuddy Basic 2.1.3", http://palmsource.palmgear.com/index.cfm?fuseaction=software.showsoftware$prodid=41824, May 16, 2002, 2 pgs.

Author Unknown, "DiveComputer for the Palm Pilot", published Mar. 15, 2001 http://members.aol.com/GLorensen/divecomp.html, 2 pgs.

Loyst et al., "Dive Computers: A Consumer's Guide to History, Theory and Performance", Watersport Publishing, Inc., 1991, pp. 4-87, 144-149.

"ATOM Operating Manual", Nov. 1, 2004, 152 pgs.

Oceanic, "GEO Watch / Dive Computer Operating Manual", Doc No. 12-2734-r02, 2002 Design, 2006, pp. 106-120.

Oceanic, "GEO Watch/Dive Computer Operating Manual", Doc No. 12-2734-r01, Oct. 20, 2006, 42 pgs.

Oceanic, "GEO Watch/Dive Computer Operating Manual", Doc. No. 12-2734-r02, Apr. 26, 2007, 42 pgs.

Stewart et al., "Diving Safety Manual", Original Printing 1954, Revised 2002, 58 pgs.

Yanko, "Smart Swimming Goggles", Design Published May 24, 2013, 16 pgs.

UNDERWATER WARNINGS

RELATED CASES

The present application is a continuation of U.S. patent application Ser. No. 14/635,747, filed Mar. 2, 2015, which is a continuation of U.S. patent application Ser. No. 13/465,480, filed May 7, 2012, and issued as U.S. Pat. No. 9,013,349, which is a continuation of U.S. application Ser. No. 12/246,408 filed Oct. 6, 2008, and issued as U.S. Pat. No. 8,174,436, which application claims priority to U.S. Provisional Application Ser. No. 60/977,749, filed Oct. 5, 2007, entitled "Dive Computer with Global Positioning System Receiver". The present application also claims priority as a continuation-in-part to U.S. patent application Ser. No. 12/170,871, filed Jul. 10, 2008, entitled "Dive Computer with Global Positioning System Receiver", which is a divisional of U.S. patent application Ser. No. 11/264,290 now abandoned. U.S. patent application Ser. No. 11/264,290 is a continuation of U.S. patent application Ser. No. 10/615,635, filed Jul. 8, 2003, and issued as U.S. Pat. No. 6,972,715, which claims priority to U.S. Provisional Application Ser. No. 60/394,982, filed Jul. 8, 2002. The disclosure of U.S. patent application Ser. Nos. 13/465,480, 12/170,871, 11/264,290, and 10/615,635, and the disclosure of U.S. Provisional Application Ser. Nos. 60/977,749 and 60/394,982 are incorporated by reference herein in their entirety.

FIELD OF INVENTION

The present invention relates generally to underwater exploration and more specifically to apparatus and techniques for determining location during a dive.

BACKGROUND OF THE INVENTION

The development of self-contained breathing systems has enabled humans to dive and remain underwater for several hours. The ability to remain underwater for an extended period of time can enable divers to reach considerable depths and cover expansive distances in exploring underwater terrain.

A problem commonly encountered by divers is an inability to accurately locate position underwater. Position is typically expressed in terms of three co-ordinates. The position of a diver underwater can be expressed in terms of a latitude, a longitude and a depth co-ordinate. The latitude and the longitude co-ordinates represent the latitude and the longitude of a point on the surface of the water directly above the diver. The depth co-ordinate represents the depth of the diver below the surface of the water. A dive computer similar to a ProPlus 2 manufactured by Oceanic Worldwide of San Leandro, Calif. can be used to track depth during a dive. However, depth alone is insufficient to locate the position of a diver during a dive.

SUMMARY OF THE INVENTION

Dive computers incorporating a variety of features are disclosed. One embodiment includes a processor, a light connected to the processor, where the light is configured to act as a flashlight, a global positioning system receiver connected to the processor, the display connected to the processor, a pressure transducer connected to the processor, and clock circuitry connected to the processor. In addition, the processor is configured to determine time using the clock circuitry, the processor is configured to determine depth of submersion using the pressure transducer, the processor is configured to generate position information using the global positioning system receiver, the processor is configured to provide depth and time information using the display, and the processor is configured to combine the time, depth, and position information into a dive log.

In a further embodiment, the light includes at least one light emitting diode and the processor is configured to activate the light in response to input received via the keypad.

Another embodiment includes a processor, a dive computer, an audio device, a communication channel connected to the processor and the audio device, and the processor is configured to generate a warning alarm using the audio device in response to a predetermined set of conditions.

A still further embodiment includes a dive computer, a dive mask incorporating an LED display configured to be visible to a diver when the dive mask is worn and the LED display is illuminated, and a wireless communication channel between the processor and the LED display. In addition, the dive computer is configured to display visual warnings via the LED display related to decompression.

Still another embodiment includes a processor, a display connected to the processor, a pressure transducer connected to the processor, clock circuitry connected to the processor, a keypad connected to the processor, and a removable memory connected to the processor. In addition, the processor is configured to determine time using the clock circuitry, the processor is configured to determine depth of submersion using the pressure transducer, and the processor is configured to provide depth and time information using the display.

In a yet further embodiment, the removable memory contains audio and/or video content.

In yet another embodiment, the removable memory contains information concerning a dive site.

A further embodiment again includes a microprocessor, a pressure transducer connected to the microprocessor, a microphone connected to the microprocessor, a speaker connected to the microprocessor, a telephone transceiver connected to the microprocessor, and a display. In addition, the microprocessor, pressure transducer and display are configured to display information concerning the dive computer's depth of submersion, and the microprocessor, microphone, speaker and telephone transceiver are configured to enable the dive computer to be used as a telephone handset.

Another embodiment again further includes a keypad connected to the microprocessor. In addition, the microprocessor, telephone transceiver and keypad are configured to enable the entry of text messages for transmission via the telephone transceiver.

In a further additional embodiment, the telephone transceiver is a cell phone transceiver.

In another additional embodiment, the telephone transceiver is a satellite phone transceiver.

A still yet further embodiment also includes a GPS receiver connected to the microprocessor. In addition, the microprocessor is configured to obtain GPS coordinates from the GPS receiver.

In still yet another embodiment, the microprocessor is configured to transmit a message containing the GPS coordinates via the telephone transceiver.

In a further additional embodiment, the microprocessor, the microphone, the speaker, the telephone transceiver, the display, and the GPS receiver are components of a mobile phone handset including an external connector for communicating with external devices, the pressure transducer is packaged separately from the mobile phone handset and the pressure transducer packaging includes a connector configured to mate with the external connector of the mobile phone handset creating a connection between the pressure transducer and the microprocessor, and the mobile phone handset and the pressure transducer are contained within a waterproof housing. In addition, a software application installed on the mobile phone handset configures the microprocessor to record information concerning the dive computer's depth and time of submersion in a dive log.

In a still further additional embodiment, the software application configures the mobile handset to upload the dive log to a remote server via the telephone transceiver.

DETAILED DESCRIPTION OF THE INVENTION

Figure 1:
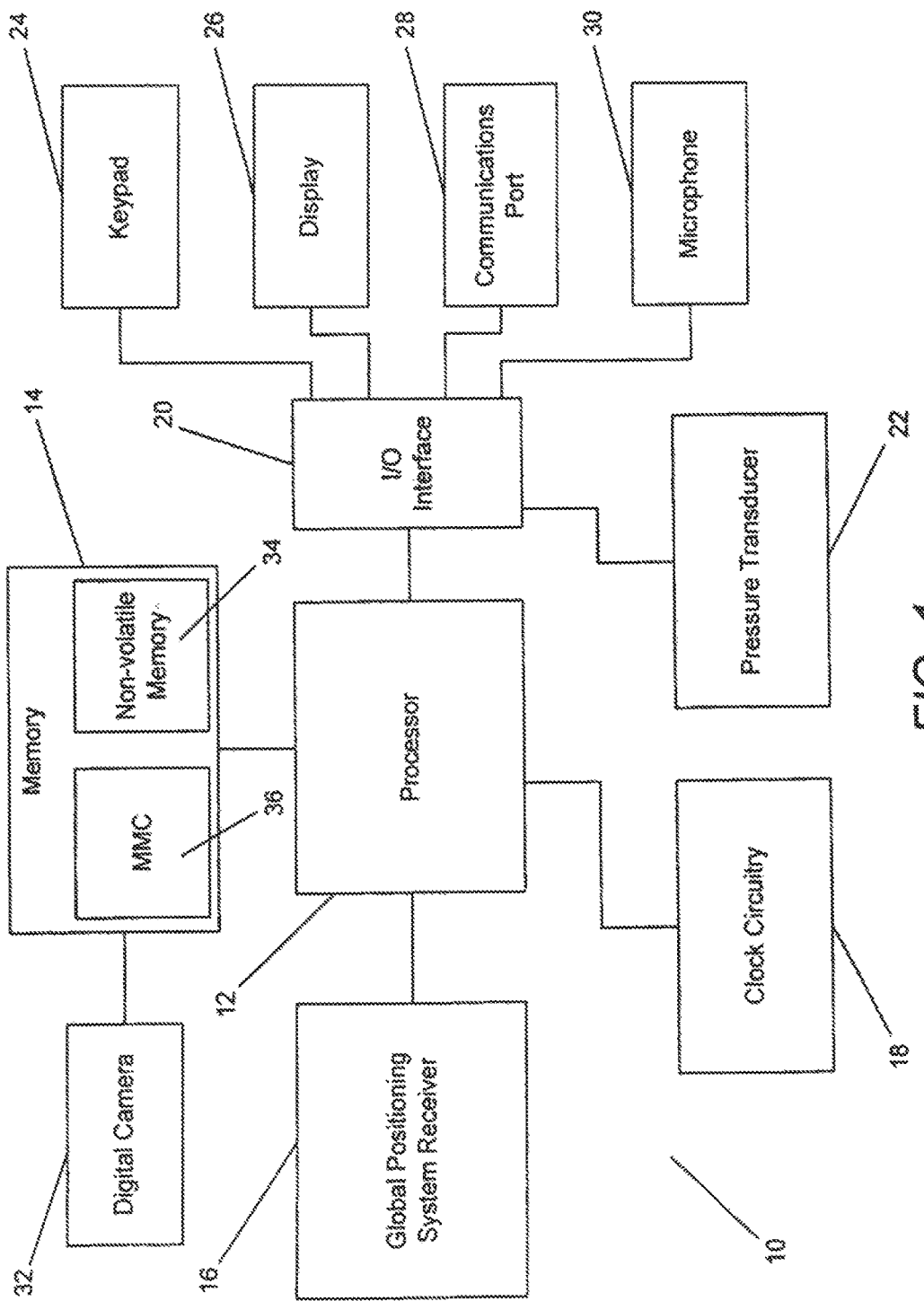
FIG. 1 is a schematic illustration of an embodiment of a dive computer in accordance with practice of the present invention.

Referring now to the drawings, dive computers in accordance with embodiments of the invention are illustrated. The dive computers make and record at least measurements of time, depth, and pressure. These measurements allow the dive computers to calculate whether a diver is ascending or descending at a safe rate and whether the diver needs to make decompression stops. The dive computers also specify the duration of the decompression stops, if they are needed. The dive computer display makes all of this information available to the diver visually. Calculations involving these measurements by the dive computer can indicate the need for warnings to the diver. Warnings to the diver can be based on air time remaining, unsafe rate of descent or ascent, decompression, or pressure. Warnings can appear on the display of the dive computer. Warnings can also be indicated to the diver by some visual display other than the display on the dive computer and/or aurally. In several embodiments, divers waiting underwater for decompression stops or for other reasons can play video and/or audio content stored in connection with the dive computer. In this way, a diver who is waiting for any period of time can watch a movie or listen to music while waiting.

The dive computers make and record at least three significant sets of measurements, which enable the estimation of the location of points of interest underwater and the path traveled by a diver during a dive. The first set of measurements typically includes measurements of latitude, longitude and time immediately prior to the commencement of a dive. The second set of measurements can be generated by periodically measuring depth and time during a dive. The third set of measurements can be compiled by measuring latitude, longitude and time immediately upon resurfacing from a dive. Following a dive, an estimation of location at a specified time during the dive using these three sets of measurements can be made by using a number of techniques in accordance with practice of the present invention. In several embodiments, the accuracy of the estimation can be increased by including measurements of speed and bearing in the second set of measurements.

Turning now to FIG. 1, a dive computer in accordance with practice of the present invention is illustrated. The dive computer 10 includes a processor 12 that is connected to memory 14, a G.P.S. receiver 16, clock circuitry 18 and an input/output interface 20. The input/output interface 20 is connected to a number of devices that can be used to communicate with a user or other devices. In one embodiment, these devices include a pressure transducer 22, a keypad 24, a display 26, a communications port 28 and a microphone 30. A digital camera 32 is also provided as an input device, however, the digital camera bypasses the microprocessor and is connected directly to the memory 14.

The processor 12 receives information from the G.P.S. receiver 16, the clock circuitry 18 and the input/output interface 20 and selectively stores the information in memory 14. In one embodiment, the processor is implemented using a MSP430F149 manufactured by Texas Instruments Incorporated of Dallas, Tex. However, the processor could be implemented using other microprocessors, discrete logic components and/or several separate processing elements that share information.

The memory 14 can be used to store data logged by the dive computer 10, to temporarily store information during the performance of calculations and to store software used to control the operation of the processor 12. The memory 14 need not be a single integrated circuit and can be constructed from a number of integrated circuits having distinct properties. In the illustrated embodiment, the memory 14 includes non-volatile memory circuits 34 to store software for controlling the processor 12, manufacturer settings, user settings and calibration data. In addition, the memory 14 also includes a removable memory device 36 that is used to store data logged during a dive such as images, a dive profile, dive logs, GPS logs and/or audio recordings. One aspect of using a removable memory device is that individual dives can be logged on separate removable memory devices and the removable memory devices used as a method of storing the logged data remote from the dive computer. In other embodiments, multimedia such as movies and/or music can be loaded into the dive computer for viewing via the removable memory. In many embodiments, the removable memory contains information concerning a dive site such as marine life common to the area, points of interest and/or maps. In embodiments that use a MSP430F149 processor or equivalent processor device, the non-volatile memory included on the processor chip can be used to implement the non-volatile memory circuits 34 and the removable memory device can be implemented using a SDMB-128-768 128 MB MultiMedia Card manufactured by SanDisk of Sunnyvale, Calif. In other embodiments, memory devices of various sizes, volatility and portability can be used depending on the software requirements of the system and the data logging requirements of the user. For example, the removable memory device can be replaced by a similar sized fixed memory device such as an AT2508N-10SI-1.8 manufactured by Atmel Corporation of San Jose, Calif. or an equivalent memory device.

The G.P.S. receiver 16 utilizes signals broadcast from satellites to make calculations of latitude and longitude. The G.P.S. receiver provides the latitude and longitude information to the processor, which is responsible for the processing and storage of the information. In one embodiment, the G.P.S. receiver is implemented using a GeoHelix-H GPS antenna manufactured by Sarantel Ltd. of Wellingborough, United Kingdom. In other embodiments, other G.P.S. receiver technologies, such as an Embedded 3.3V G.P.S. Antenna in conjunction with an M-LocJ MPM module both manufactured by Trimble Navigation Limited of Sunnyvale, Calif., can be used that are capable of providing information to the processor generating latitude and longitude co-ordinates.

The clock circuitry 18 can be used to measure the passage of time. Typically the clock circuitry 18 will incorporate a quartz crystal that is used to generate a periodic signal that can be observed in order to measure the passage of time. The clock circuitry 18 can also be synchronized with an external clock to enable time to be expressed in absolute terms using a time, a day, a month and a year. In one embodiment the clock circuitry is part of the MSP430F149 microcontroller described above. In other embodiments, the absolute time can be obtained using the G.P.S. receiver 16.

The input/output interface 20 can be constructed from any variety of wires, antennas, transmitters, receivers, connectors and buffers. The configuration of the input/output interface 20 is dependent on the input/output devices that are connected to the dive computer. In the embodiment shown in FIG. 1, the input/output devices include a pressure transducer, a keypad, a display, a communications port and a microphone. In other embodiments, any other combination of input/output devices can be connected to the dive computer via the input/output interface. In one embodiment, the portion of the input/output interface connected to the pressure transducer includes a standard analog to digital converter. In addition, the input/output interface uses a display driver such as an S6B33A1 manufactured by Samsung of Seoul, South Korea to connect to segment display 26 and a CS53L32A High Speed Analog to Digital converter manufactured by Cirrus Logic, Inc. of Austin, Tex. to connect to the microphone 30.

The pressure transducer 22 can be used to measure the pressure of the water in which the dive computer is immersed. In one embodiment a 17887.A Low Pressure Transducer manufactured by Pelagic Pressure Systems of San Leandro, Calif. can be used to construct the pressure transducer 22. In other embodiments, other circuits capable of generating an electrical signal indicative of the water pressure in which the dive computer is immersed can be used.

A keypad 24 is typically provided to enable the user to enter information concerning the dive or to direct the processor 12 to provide the user with information. In one embodiment, the keypad 24 includes one or more buttons that can be used to tag the location of the user as a point of interest. As will be explained in greater detail below, the tagged location can be subsequently retrieved from the memory 14 of the dive computer 10. In other embodiments, the keypad 24 can include one or more buttons, toggles, joysticks or equivalent devices with which the user can provide instructions to the processor 12.

A display 26 is typically provided to present information in a graphical manner to the user. Information that can be provided to the user includes a recent G.P.S. reading, depth and/or time. If the dive computer 10 performs other functions, information relating to these functions can also be communicated using the display 26.

One skilled in the art will appreciate that the connection of keypads 24 and displays 26 to dive computers 10 is well known and any number of possible configurations, devices and circuitry could be used to establish a connection between these devices and the processor 12.

The communications port 28 is provided to enable the transfer of information between the dive computer 10 and other devices. In one embodiment, the communications port 28 is an Integrated Low Profile Transceiver Module IrDA standard such as the TFDU4100 manufactured by Vishay Semiconductor, Inc. of Malvern, Pa. In other embodiments, other wired or wireless connections and protocols can be used to communicate with external devices. The transfer of information via the communications port 28 enables the movement of data and new software between the dive computer 10 and other devices. In one embodiment, dive information stored in the dive computer memory 14 can be loaded onto a personal computer and stored, graphed or manipulated. In addition, information from a previous dive stored on an external device can be loaded into the memory 14 of the dive computer for reference during a subsequent dive or information stored within the dive computer can be manipulated by external devices.

The microphone 30 is provided to enable the audio annotation of data logged by the dive computer 10. The annotations can be made before, during or after a dive by making a digital recording of the words spoken by the user and associating them with a particular dive or with particular tagged locations. In other embodiments, automatic speech recognition could be used to generate textual annotations. The addition of automatic speech recognition technology would also enable the dive computer to respond to audible instructions from the user. In one embodiment, the microphone 30 can be a MAB-06A-B manufactured by Star Micronics Company, Ltd. of Edison, N.J. As described above, the input/output interface 20 can include an analog-to-digital converter for connection to the microphone. The analog-to-digital converter can sample the analog signal generated by the microphone 30 and generate a digital representation of the analog signal. In one embodiment, the analog-to-digital converter samples the signal from the microphone 30 at a rate of 8 kHz and uses 28 quantization levels to represent the signal. In other embodiments, other sampling rates and a different number of quantization levels can be used as is appropriate.

In embodiments where automatic speech recognition is used, the processor 12 or a discrete device in the input/output interface 20 can convert the digital representations of the signals from the microphone 30 to text or commands using hidden Markov models, neural networks, hybrid neural network/hidden Markov models or other speech modeling or recognition techniques. In one embodiment, speech recognition is performed using a RSC-4x Speech Recognition Microcontroller manufactured by Sensory, Inc. of Santa Clara, Calif.

The digital camera 32 is provided to enable the capture of images during a dive and to enable the use of these images as part of a dive log if desired by the user. The digital camera can be implemented using a lens and an array of charge coupled devices both of which are contained within the waterproof dive computer housing. In one embodiment, the digital camera is implemented using a MB86S02A CMOS sensor manufactured by Fujitsu Microelectronics America, Inc. of Sunnyvale, Calif. to capture image information and a MCF5307 Direct Memory Access Controller manufactured by Motorola, Inc. of Schaumburg, Ill. to transfer the image information directly to the memory 14. In other embodiments, any circuitry capable of capturing a digital image can be used to obtain image information and store it in memory either via direct memory access or using the processor 12 in combination with the input/output interface 22.

Other input or output devices in addition to those described above can be connected to a dive computer in accordance with the present invention. In one embodiment speakers are connected to the input/output interface to enable the playback of recorded speech or to allow a diver to listen to music during a dive. In other embodiments, other combinations of devices can be used to meet the information requirements and data recording requirements of a diver during a dive.

Figure 2:
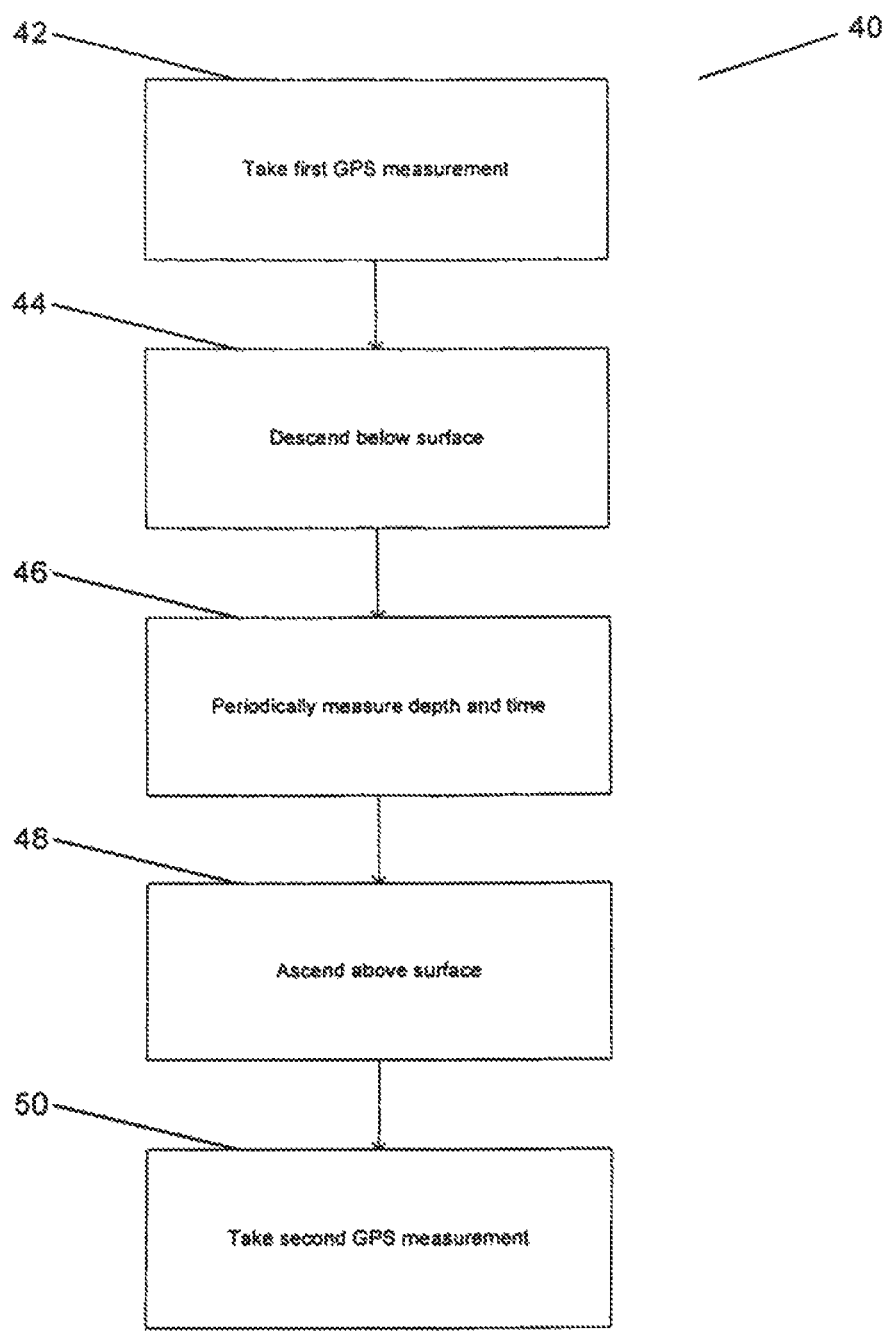
FIG. 2 is a flow chart illustrating a method of recording latitude, longitude, depth and time during a dive in accordance with practice of the present invention.

Turning now to FIG. 2, a method 40 of recording information during a dive that enables estimation of position in accordance with an embodiment of the invention is illustrated. The method includes taking (42) a first G.P.S. measurement, which is performed prior to descending (44) below the surface. Once below the surface, depth and time are periodically measured (46). After ascending (48) to the surface, a second G.P.S. measurement is taken (50).

If data is logged during a dive in accordance with the method 40, then position during the dive can be estimated. If the user tags a particular location during a dive as being of interest, then the user can use the data logged in accordance with the method 40 shown in FIG. 2 to subsequently locate the point of interest.

Figure 3:
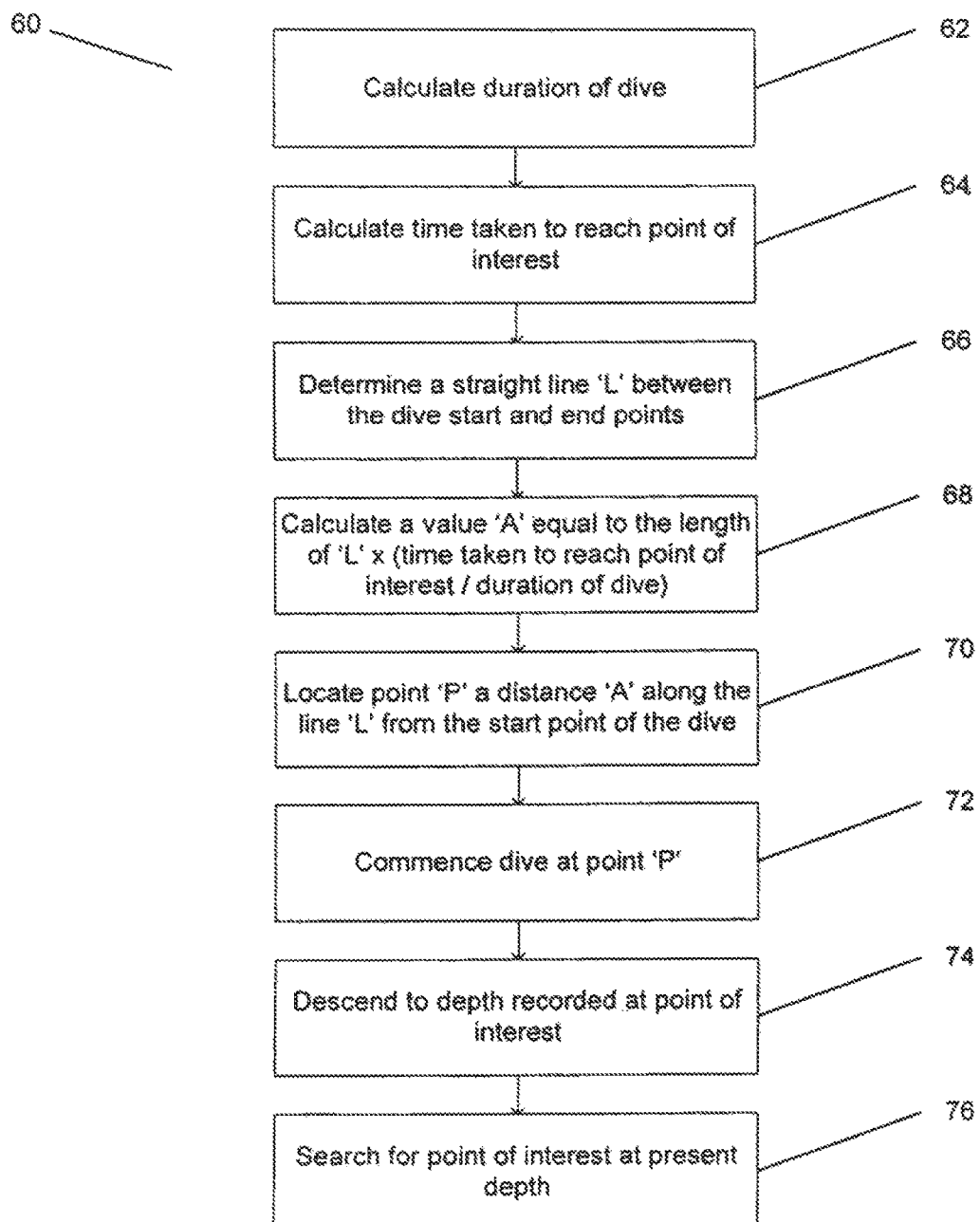
FIG. 3 is a flow chart illustrating a method of locating a point of interest using data recorded in accordance with practice of the present invention.

Turning now to FIG. 3, a method of locating a previously identified point of interest using data logged in accordance with practice of the present invention is illustrated. The method 60 includes calculating (62) the duration of the recorded dive, calculating (64) the time that was taken to reach the identified point of interest from the start point of the dive and determining (66) a straight line 'L' between the start point of the dive and the end point of the dive. Once these functions have been performed, a value 'A' is then calculated (68), which is equal to the length of the line 'L' multiplied by the time taken to reach the point of interest and divided by the duration of the dive. The value 'A' is then used to locate (70) a point 'P', which is a distance 'A' from the start point of the dive along the line 'L'.

Once the point 'P' has been identified, a diver can travel (72) to the latitude and longitude of point 'P' and commence a dive. The diver can then enter the water and descend (74) to the recorded depth of the point of interest. At this depth, the point of interest can be located by searching (76) outwardly while attempting to maintain the recorded depth of the point of interest. The depth of a point of interest is particularly important in relocating that point. The co-ordinates calculated as the latitude and longitude of a point of interest using data collected by a dive computer in accordance with the practice of the present invention are simply estimates that place a diver in the vicinity of the point of interest. The knowledge of the depth at which the point of interest is located enables the diver to perform an expanding search in the plane of that depth. Without this information, a diver could be forced to search in three dimensions instead of two. The advantages of knowing a depth co-ordinate are increased when the point of interest forms part of the topography of the sea floor. A diver can rapidly locate such a point of interest by simply descending to the recorded depth of the point of interest and then searching outwardly from the point of descent until a portion of the sea bed is encountered at the recorded depth of the point of interest. By following the topography of the sea bed at the depth of the point of interest, the diver has a high likelihood of rapidly relocating the point of interest.

The method 60 illustrated in FIG. 3 can use data recorded in accordance with the method 40 shown in FIG. 2. The time recorded at the beginning of the dive and the time recorded at the end of the dive can be used to calculate (62) the duration of the dive. Likewise, the time at the beginning of the dive and the time recorded at the point of interest can be used to calculate (64) the time taken to reach the point of interest. The latitude and longitude co-ordinates at the beginning of the dive and the latitude and longitude co-ordinates at the end of the dive can be used to generate the line 'L' (68) and the times calculated above can be used to locate the estimated latitude and longitude of the point of interest as described above.

Other techniques can be used to locate a point of interest using data recorded in accordance with embodiments of the invention. In one embodiment, the logged data can be used to return to a point of interest by commencing the second dive at the latitude and longitude of whichever of the start and end points of the earlier dive was closest to the point of interest. The diver can then travel towards the other of the start and end points. The point of interest can then be located by traveling in this direction at the recorded depth of the point of interest for a time approximating the time it took to travel to the point of interest during the previous dive.

If a diver seeks to be able to return to a point of interest with a high degree of accuracy on subsequent dives, then the diver is advised to ascend to the surface at the point of interest. The dive computer 10 can then make a G.P.S. measurement and the diver can be confident that returning to the recorded latitude and longitude and descending to the recorded depth will enable rapid location of the point of interest.

Figure 4:
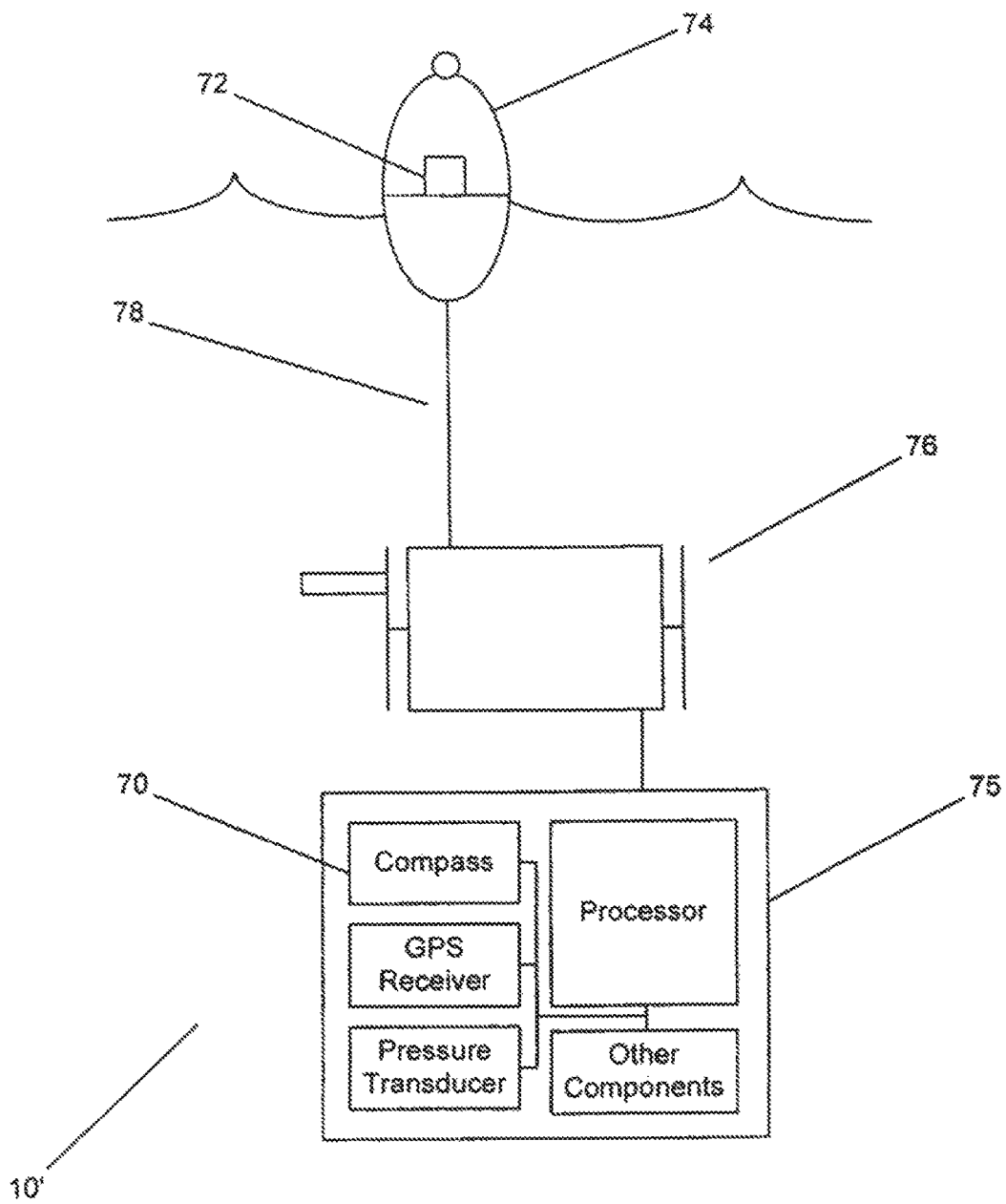
FIG. 4 is a schematic illustration of a dive computer including a buoy having a G.P.S. receiver antenna that is connected to the dive computer via a spool of communication cable.

An alternative to ascending to the surface is to use the dive computer 10' illustrated in FIG. 4 that includes a compass 70 and a G.P.S. antenna 72 mounted on a buoy 74, which is connected to the other components of the dive computer 75 via a spool 76 of communication cable 78. In other embodiments, a wireless connection is used between the spool and the other components of the dive computer. When a diver wishes to take a measurement of latitude and longitude at a point of interest, the buoy is released. At the surface, the antenna can receive the satellite signals required to measure latitude and longitude. These signals are then conveyed to the G.P.S. receiver via the communications cable. In other embodiments, additional components such as the entire G.P.S. receiver can be included in the buoy. In one embodiment the spool is an AR-05 manufactured by Saekodive of Taiwan.

Figure 5:
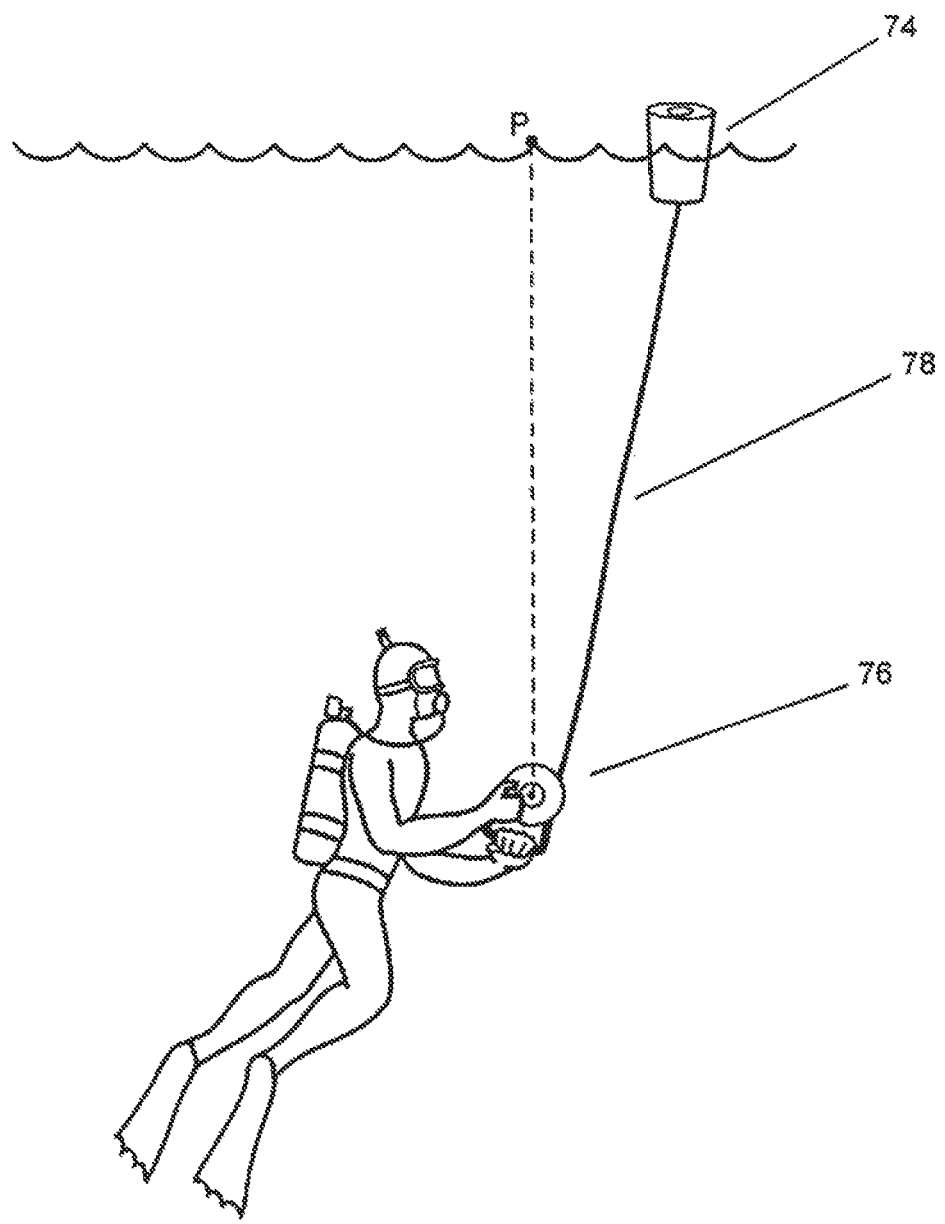
FIG. 5 is a side view of a submerged diver equipped with a dive computer in accordance with the present invention including a buoy that is deployed at the surface.

Displacement of the buoy relative to the position of the diver is illustrated in FIG. 5. The displacement of the buoy 74 relative to a position "P" directly above the diver can be calculated using Pythagorus' theorem by measuring the length of communication cable 78 released from the spool 76 and the depth of the diver. The length of communication cable released can be measured using markings on the cable 78 and entered in the dive computer manually or via voice command. Alternatively an external line counter could be used that communicates to the processor of the dive computer via a wireless or wired link. The depth of the diver can be measured using the dive computer in the manner described above. The direction of the displacement can be determined using a compass bearing of the cable relative to the diver.

Figure 6:
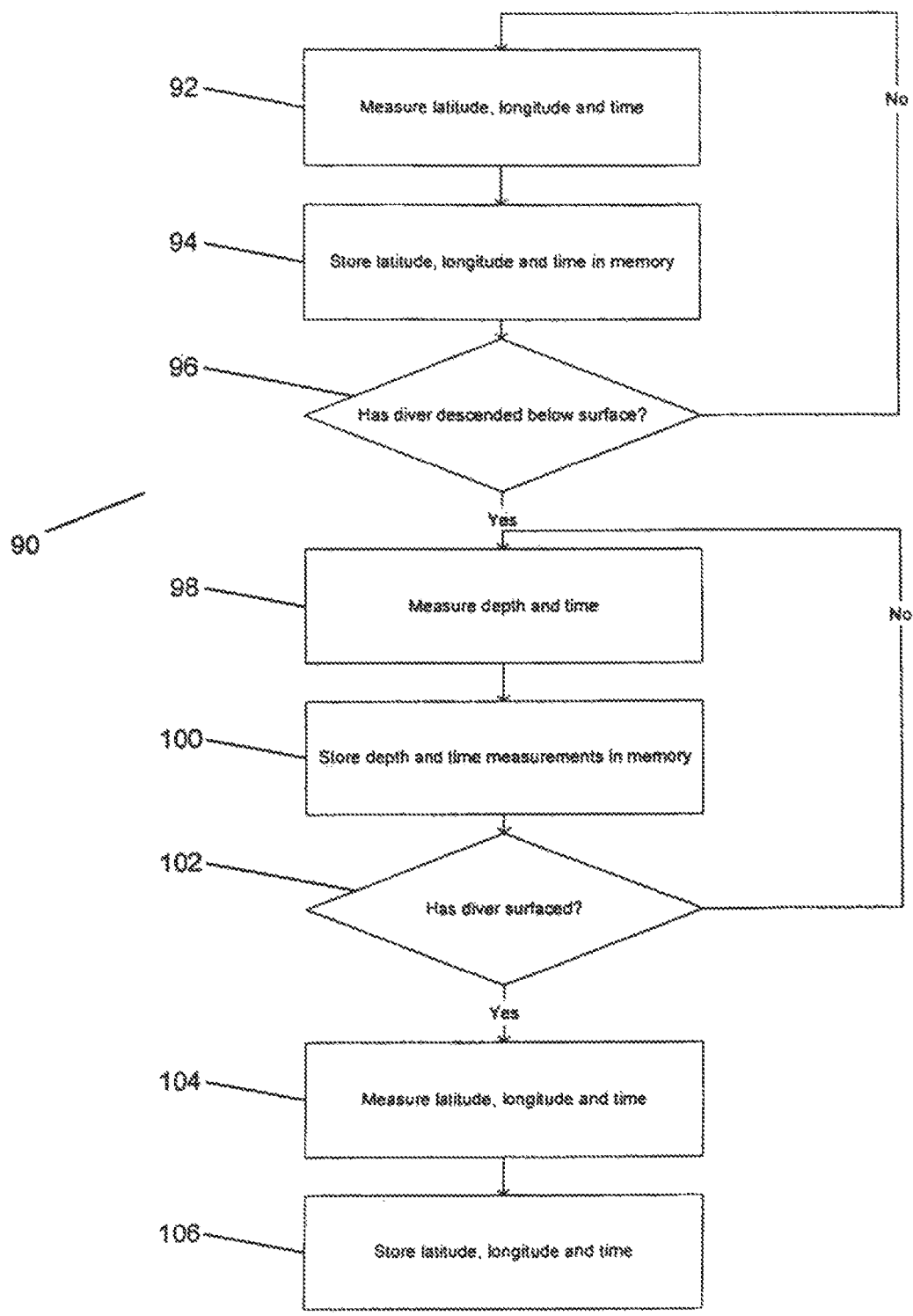
FIG. 6 is a flow chart illustrating a method of recording latitude, longitude, depth and time during a dive in accordance with an embodiment of the present invention that ensures that an automatic measurement of latitude, longitude and time is made as a dive is commenced.

Embodiments of the dive computer in accordance with practice of the present invention can enable automatic recording of latitude and longitude immediately prior to the dive computer 10 descending below the surface of the water and immediately upon returning to the surface. Turning now to FIG. 6, a method in accordance with practice of the present invention for automatically recording the latitude, longitude and time prior to commencing a dive and upon surfacing from a dive is illustrated. The method 90 includes making (92) and storing (94) measurements of latitude, longitude and time using a G.P.S. receiver. The process of measuring latitude, longitude and time with the G.P.S. receiver and storing the values continues until the diver descends below the surface and the answer to the decision (96) of whether the diver has descended below the surface becomes affirmative.

Once the diver is below the surface, measurements (98) of depth and time are made and the measurements are recorded (100) in the memory of the dive computer. The measurement and recording of depth and time continues for as long as the diver remains below the surface and until the answer to the decision (102) of whether the diver has surfaced is affirmative. Once the diver has surfaced, a measurement (104) of latitude, longitude and time is made and the measurement is recorded.

The method 90 described in FIG. 6 can ensure that the measurement stored at the commencement of the dive is the most recent measurement of latitude, longitude and time that has been made by the G.P.S. receiver 16 and dive computer 10. In addition, the method 90 enables periodic measurement of depth and time during the dive and the rapid recording of latitude, longitude and time when the diver resurfaces. In other embodiments, the logging of latitude, longitude and time can be initiated in response to user input.

Figure 7:
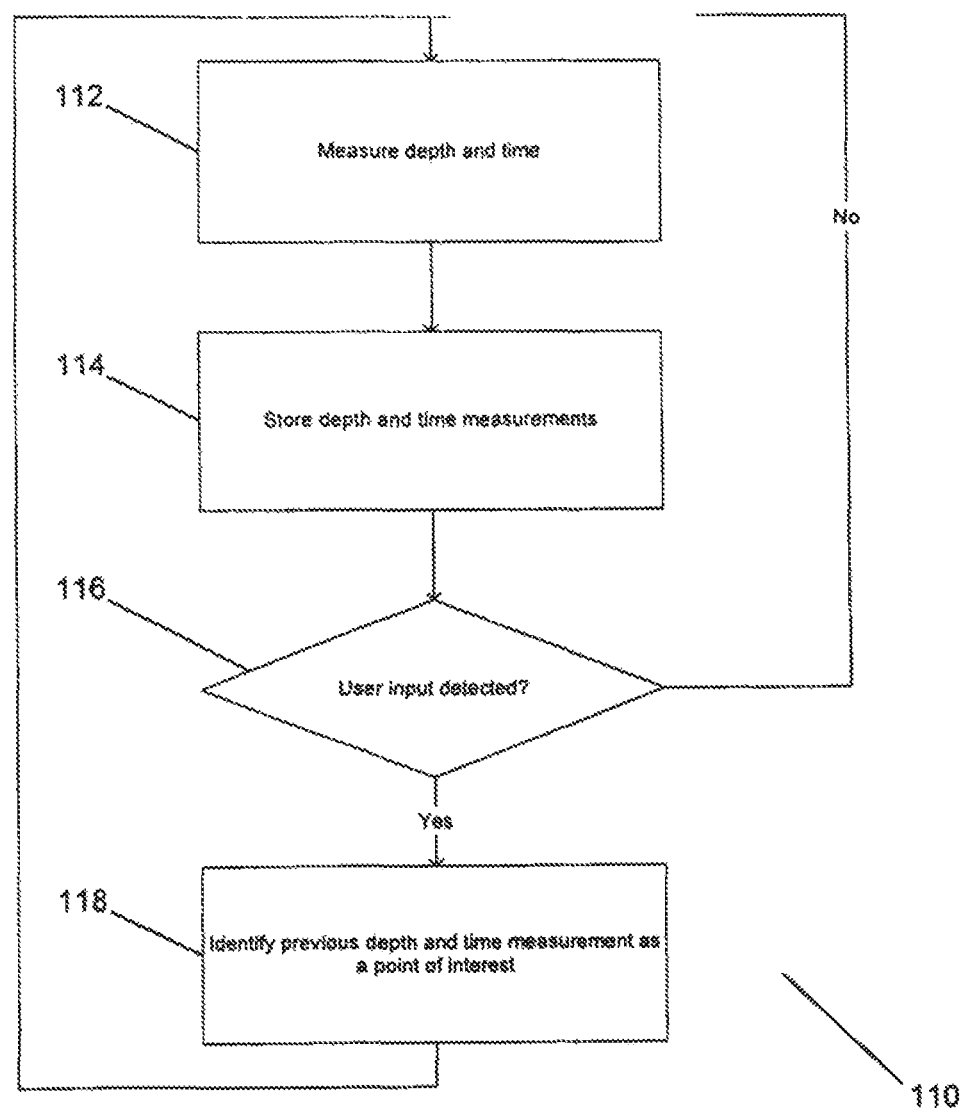
FIG. 7 is a flow chart illustrating a method of recording locations that a diver considers important.

The method 90 shown in FIG. 6 can be modified to enable the diver to identify points of interest during the dive. Turning now to FIG. 7, a method in accordance with the practice of the present invention of identifying points of interest during a dive is illustrated. The method 110 is performed while the diver is under water. The method 110 can commence with the measurement (112) of depth and time. Once a measurement of depth and time has been made, the measurements are recorded (114). Prior to making another measurement of depth and time, a check is made (116) for any user input. If user input is detected, then the previous or next depth and time measurements are identified (118) as a point of interest.

In addition to identifying points of interest, it is desirable to be able to associate information with a point of interest. One advantageous method of providing inputs to a dive computer 10 is through the use of a microphone, as is described above. Speech commands can be used to control the function of the dive computer and speech can be either recorded or converted to text in order to provide description or annotation to a point of interest. In embodiments where speech can be recorded, the recording of speech can be initiated by the pressing of a button on the keypad 24 or by a voice command recognizable by the dive computer. In one embodiment, the microphone is contained within a full face mask enabling speech to be recorded underwater. In other embodiments, more than one microphone is included so that a diver may record speech using a first microphone and underwater sounds or environmental noise using a second microphone. In embodiments of the dive computer 10 that include a digital camera 32, one or more still images or a series of still images forming a video sequence can be recorded and associated with a point of interest.

Figure 8:
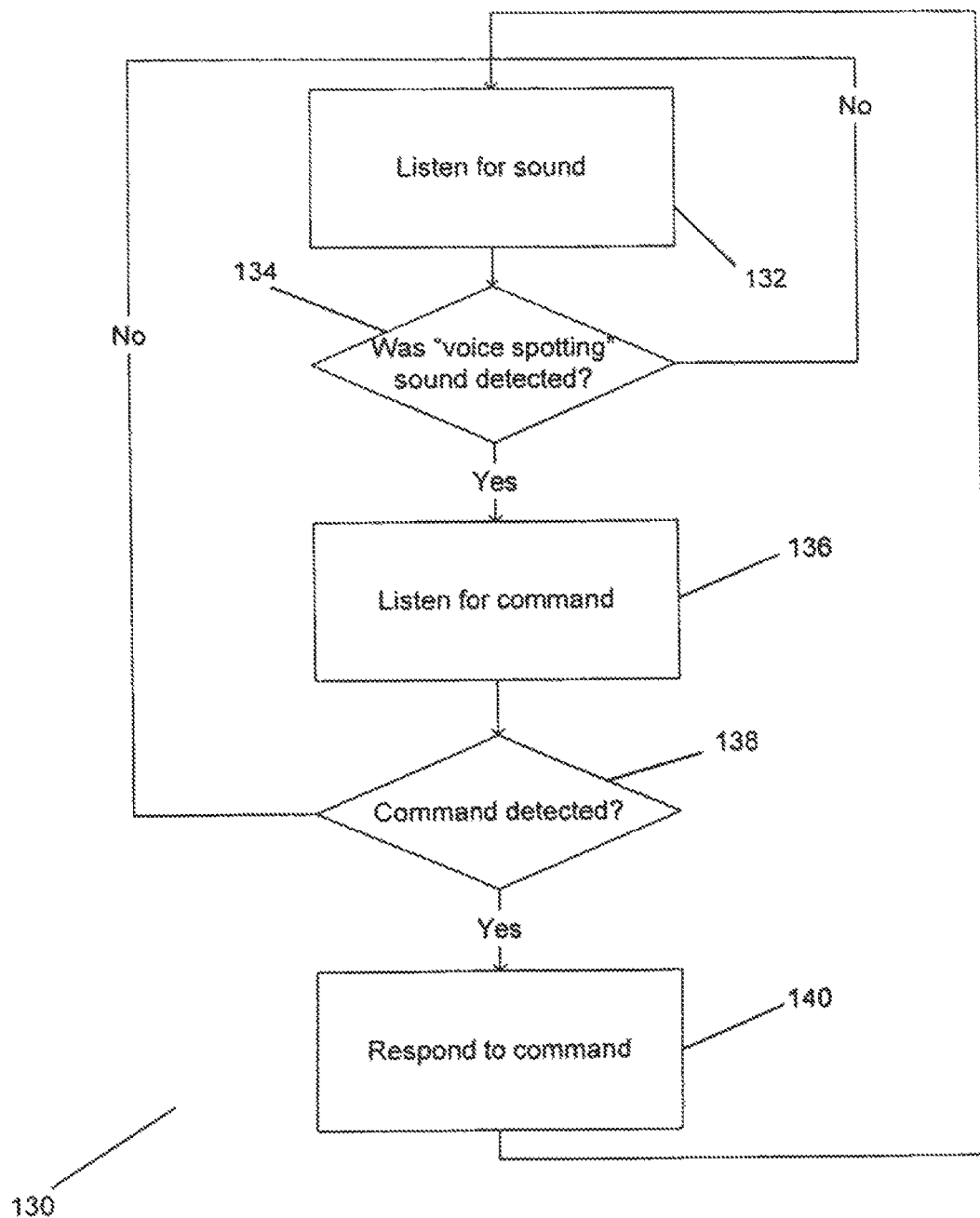
FIG. 8 is a flow chart illustrating a method of detecting speech commands in accordance with practice of the present invention.

Turning now to FIG. 8, a method in accordance with practice of the present invention is illustrated for responding to voice commands. The method 130 includes listening (132) for sound. Once sound is detected, a decision (134) is performed to determine if a "voice spotting" sound has been detected. A "voice spotting" sound is a spoken word such as "computer" that can indicate that a user is preparing to speak a command to a dive computer 10.

If the "voice spotting" sound is detected, then the method involves listening (136) for a command. A dive computer 10 in accordance with practice of the present invention will typically have a library of commands each requiring different responses from the processor 12. If a sound is heard, then a decision (138) is performed to determine whether the sound corresponds to one of the commands recognized by the dive computer 10. If a command is recognized, then a response is made (140) to the command. Once the response is complete, the process 130 returns to listening (132) for sound to await the next command.

The method 130 described above uses a "voice spotting" technique. In other embodiments, "voice spotting" is not required. The speech recognition performed in "voice spotting" and detecting commands can be either discrete or continuous recognition. The speech recognition can also be either speaker dependent or speaker independent. In embodiments where annotation of points of interest can be performed, a speech command can cause the processor to begin digitally recording speech and to associate the recording with a particular point of interest. In other embodiments, other forms of user input can be used to identify a point of interest and to commence the digital recording of speech. Alternatively, a command can cause the processor to convert a passage of speech to text using speech recognition techniques and to associate the text with a point of interest that can be identified using speech commands or using an alternative user input technique.

As was observed above, latitude, longitude and time measurements made in accordance with practice of the present invention can be used to estimate the latitude and longitude of a point of interest. The accuracy of this estimate can be effected by currents and the variation in the speed at which the diver traveled during the dive. The accuracy of the estimated latitude and longitude of a point of interest can be improved in accordance with the practice of the present invention by taking measurements of water speed and bearing as is discussed below.

Figure 9:
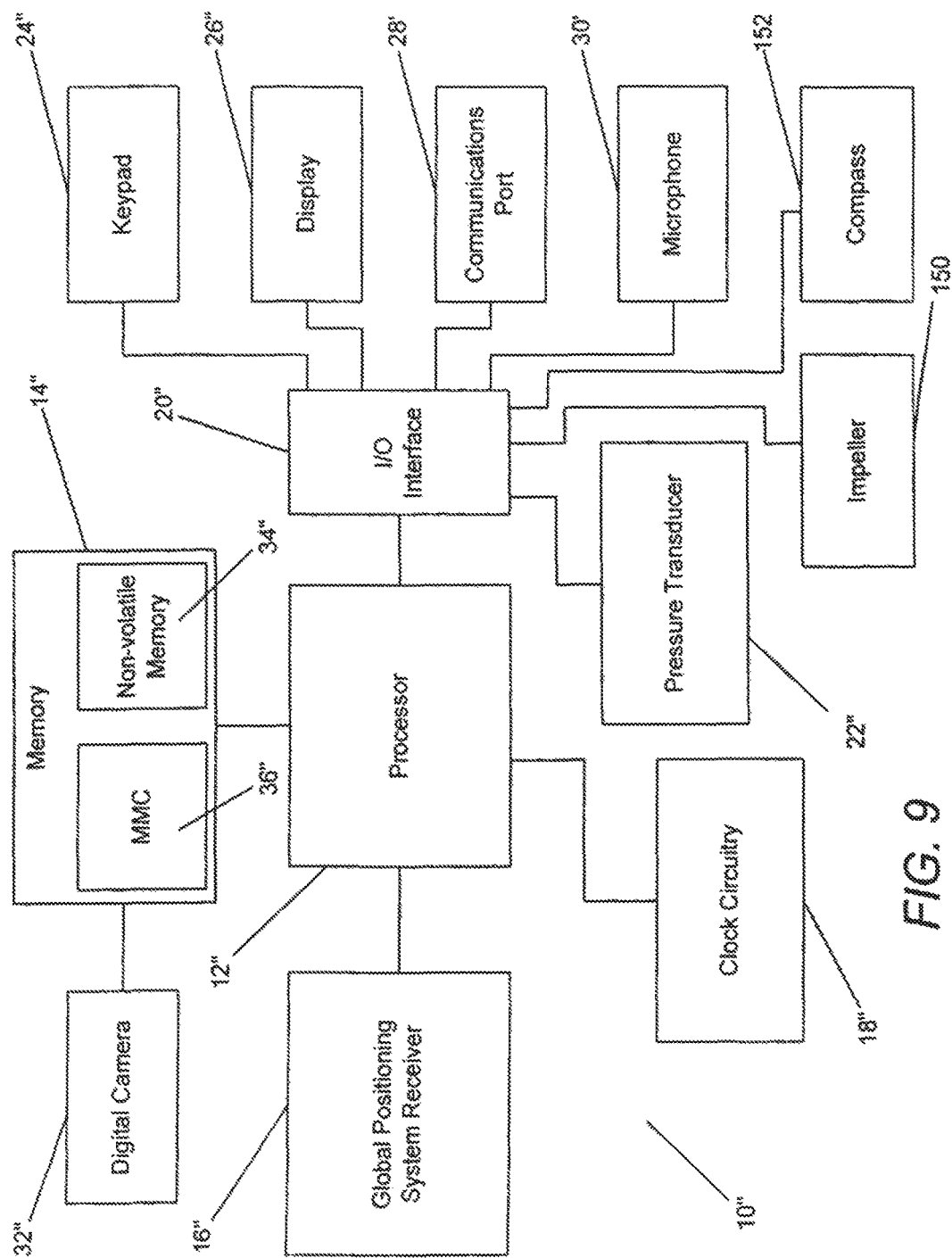
FIG. 9 is a schematic illustration of an embodiment of a dive computer in accordance with practice of the present invention that includes an impeller and a compass.

A dive computer 10" in accordance with the practice of the present invention including an impeller and a compass is illustrated in FIG. 9. The dive computer 10" is similar to the dive computer 10 illustrated in FIG. 1, but with the addition that an impeller 150 and a compass 152 are connected to the processor via the input/output interface. Impellers are devices that generate signals that can be used to measure the flow rate of a liquid or the water speed of the dive computer. By attaching an impeller equipped dive computer to a diver, the output of the impeller can be used to measure the speed at which the diver is moving through water and the compass can be used to provide signals to the processor indicative of the direction in which the diver is moving. In one embodiment, a 3000 impeller manufactured by Nielsen-Kellerman of Chester, Pa., in conjunction with a receiver coil connected to a counter that can be used to implement the impeller and a HMC 1055 3-axis magnetic sensor manufactured by Honeywell International of Morristown, N.J., that can be used to implement the compass. In other embodiments other types of flow measurement devices can be used to measure water speed.

Figure 10A:
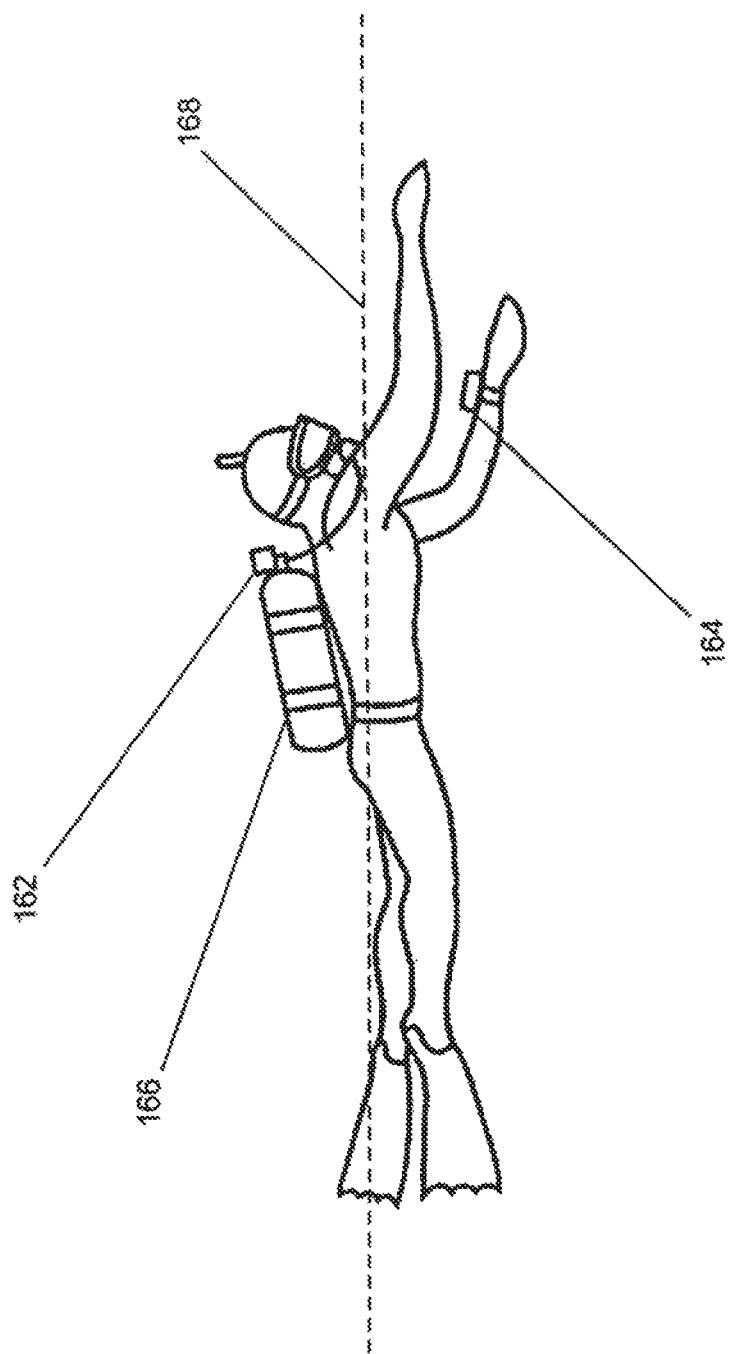
FIG. 10A is a side view of a diver equipped with a dive computer attached to an air tank and a wrist mounted display device in accordance with practice of the present invention.

A diver equipped with a dive computer in accordance with the present invention is illustrated in FIG. 10A. The dive computer 160 is implemented as two discrete components 162 and 164. The first component 164 is worn around the wrist of the diver and includes all of the components of the dive computer 10" illustrated in FIG. 10A except for the impeller and the compass. The impeller and the compass are located in a second component 162 that is fixed to an air tank worn 166 by the diver. In the illustrated embodiment, the two components communicate via a wireless communications link. In other embodiments, the two components can communicate via a wired communications link.

While embodiments shown in FIG. 9 and FIG. 10A include an impeller and a compass, embodiments of the present invention where the parts of the dive computer are distributed between multiple self-contained components need not include an impeller or a compass. In one embodiment, the G.P.S. receiver can be located within a first self-contained component that is attached to the tank, second stage, or thereabouts, and the remaining parts of the dive computer can be located within a second self-contained watch-like component attached to the diver's wrist or other appropriate part of the diver's body. In several embodiments, the dive computer includes multiple self-contained components that are capable of exchanging information and the parts of the dive computer are distributed between the multiple self-contained components.

In one embodiment, the dive computer can be contained in a single self-contained watch-like unit that is attachable to the diver's wrist or another appropriate part of the diver's body. In another embodiment, the display, keypad, and microphone can be located in a first self-contained watch-like component attached to the diver's wrist or other appropriate part of the diver's body and remaining parts of the dive computer can be located within a second self-contained component attached to the tank, second stage, or thereabouts. In any of the embodiments which involve the dive computer implemented in separate components, the components can communicate via a wired or wireless communication link. In one embodiment, the wireless communication link is implemented using radio frequency communication. In one embodiment, the wireless communication link is implemented using piezoelectric communication. In another embodiment, the wireless communication link is implemented using magnetic fields.

Returning to embodiments including an impeller and compass, typically a diver is fully extended while swimming and fixing the impeller in a direction parallel to the long axis 168 of the diver as the diver swims provides an accurate measurement of the speed of the diver. In addition, mounting the compass so that the bearing measurement is made along a line parallel to the long axis of the diver also enables an accurate measurement of bearing to be made. In order to accurately align the impeller and compass, it is desirable that the impeller and the compass be fixed to maintain a position relative to the body of the diver throughout the dive. Therefore, in the embodiment illustrated in FIG. 10A the impeller and the compass are fixed to the air tank 166 and aligned to be approximately parallel to the long axis 168 of the body of the diver, when the diver is fully extended.

Figure 10B:
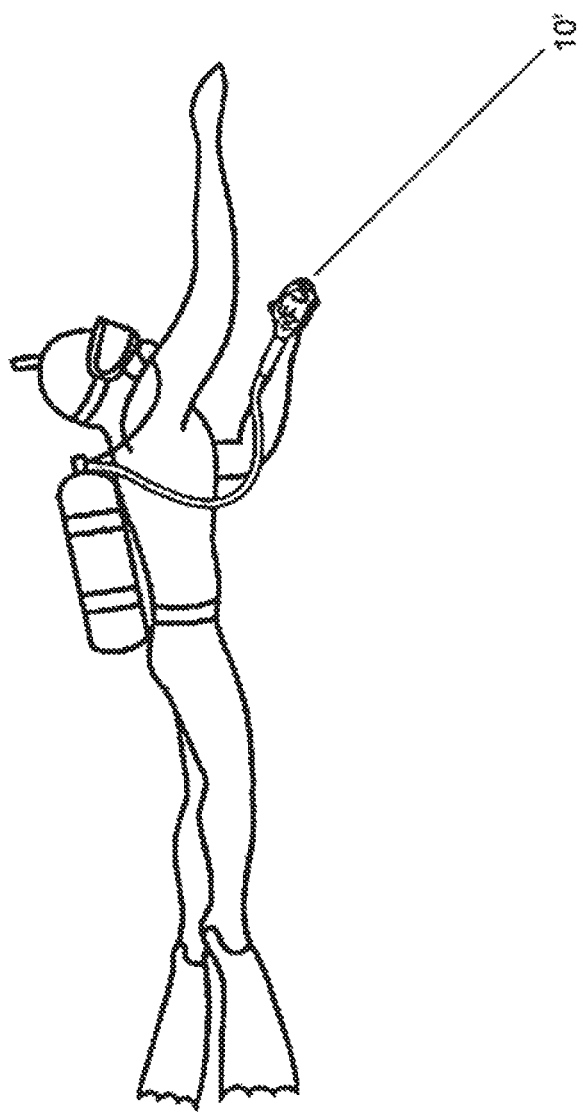
FIG. 10B is a side view of diver using a dive computer that includes an impeller and a compass that is hose mounted.
Figure 10C:
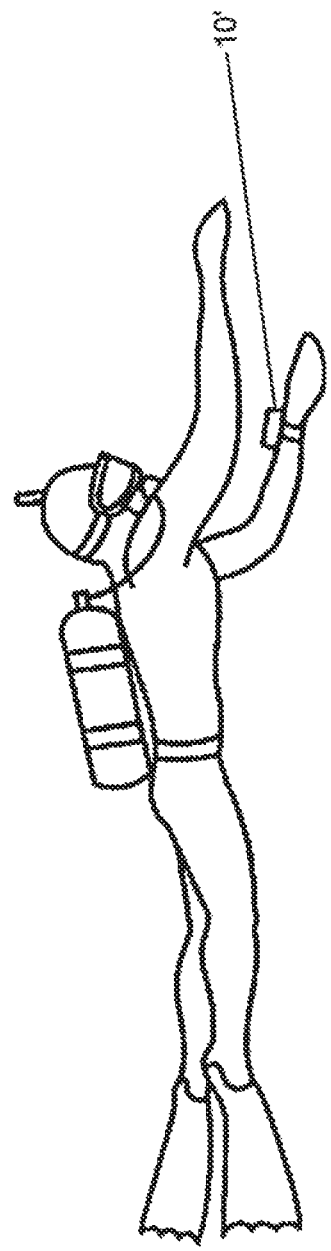
FIG. 10C is a side view of diver using a dive computer that includes an impeller and a compass that is wrist mountable.

In other embodiments, the impeller and the compass can be fixed to other locations on the body or equipment of a diver. In many embodiments, the compass and impeller are included in a single unit with the other components of the dive computer and the position of the impeller and the compass can be controlled by the diver. A diver can use such a dive computer in accordance with the present invention to take instantaneous current readings, to use instantaneous speed calculations to calculate range based on air time remaining (see discussion below) or for any other application where an instantaneous measurement of speed can be useful. An example of a hose mounted dive computer 10" including an impeller and a compass is illustrated in FIG. 10B and an example of wrist mountable dive computer 10" including an impeller and a compass is illustrated in FIG. 10C. In several embodiments, accelerometer are used either in combination with an impeller or as a substitute for an impeller in order to make distance and velocity measurements.

Figure 11:
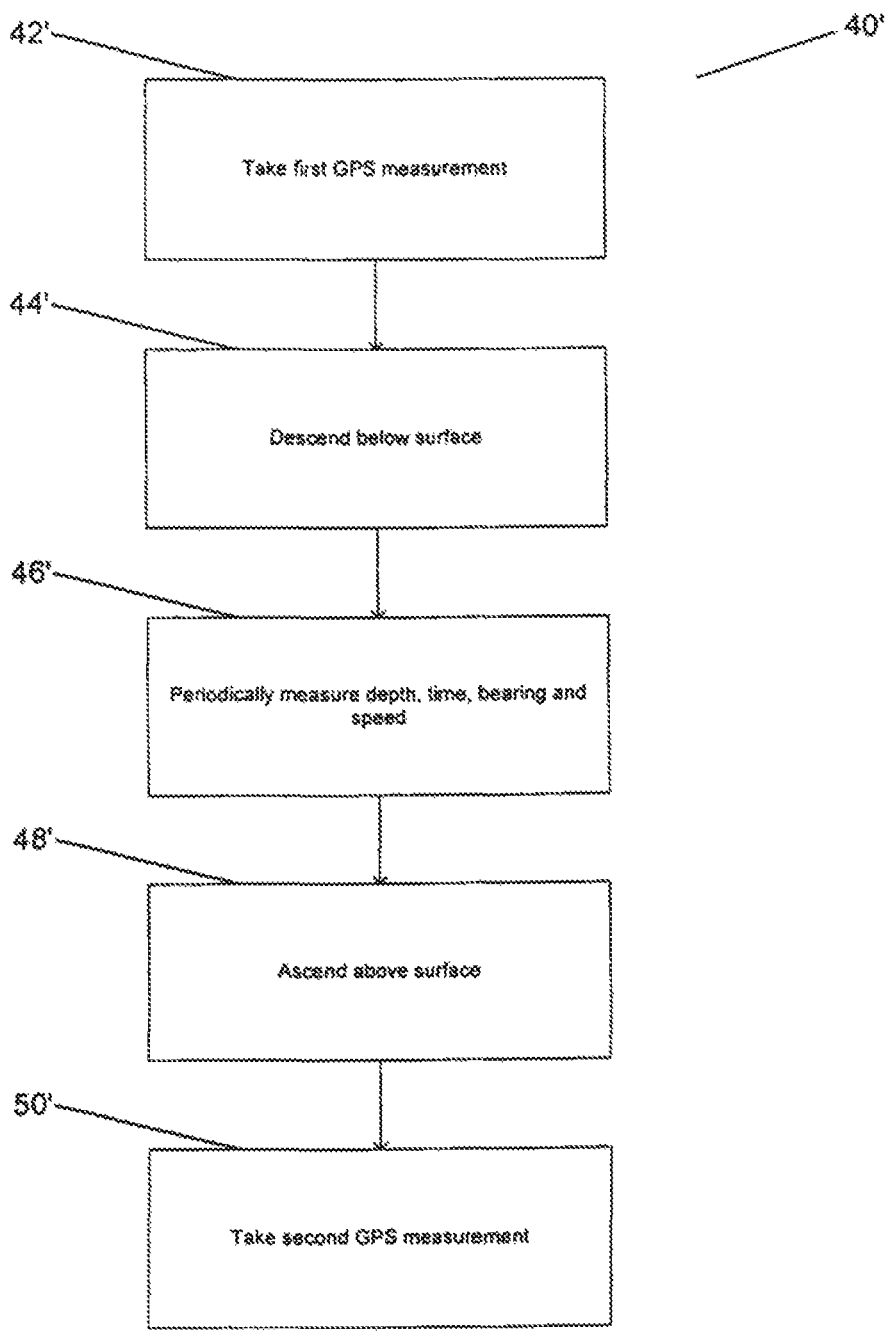
FIG. 11 is a flow chart illustrating a method of recording latitude, longitude, depth, time, bearing and water speed during a dive in accordance with an embodiment of the present invention.

A method of recording data in accordance with an embodiment of the invention is shown in FIG. 11. The method 40' is similar to the method 40 illustrated in FIG. 2, with the difference that the periodic measurements of depth and time are supplemented with periodic measurements of bearing and water speed.

Assuming there is insignificant current, the measurements obtained using the process illustrated in FIG. 11 provides a complete map of the course taken by a diver. The starting latitude and longitude locations provide the origin of the course and the path followed by the diver can be determined using the water speed, bearing, depth and time information. Factors such as drift current can be accounted for by scaling the course to ensure that it terminates at the location where the diver surfaced, as measured using the G.P.S. receiver. This scaling can be performed by the dive computer or by an external device that manipulates data provided by the dive computer. Drift currents can also be compensated for using measurements made by configurations of accelerometers.

Figure 11A:
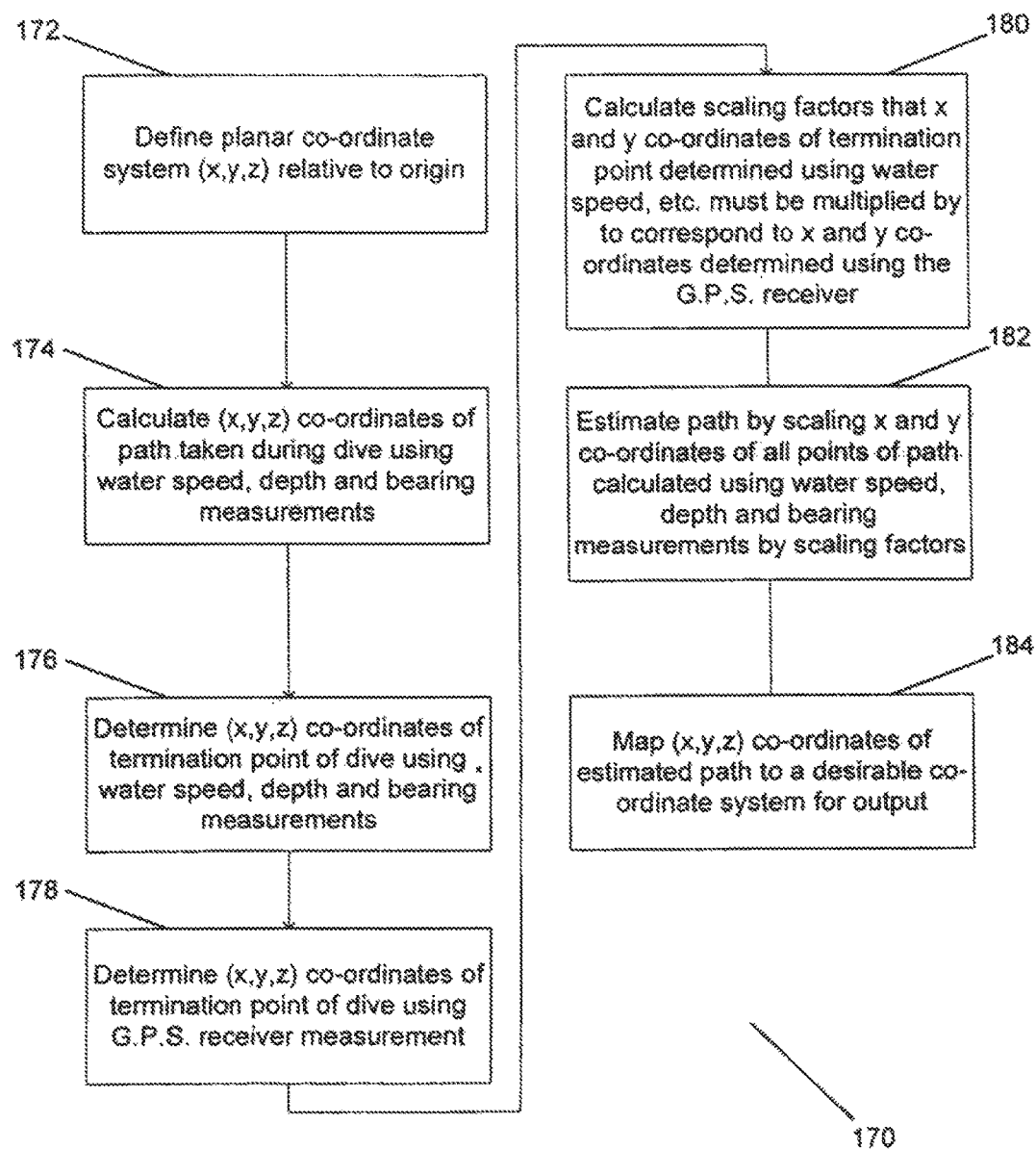
FIG. 11A is a flow chart illustrating a method of estimating the course taken by a diver based on G.P.S. measurements and water speed, depth and bearing measurements recorded during the dive.

In one embodiment, the process illustrated in FIG. 11A is used to adjust or scale the course obtained using recorded water speed and bearing measurements in response to the latitude and longitude measurements obtained at the origin and termination of a dive. The process 170 includes defining (172) a planar co-ordinate system at the origin of the dive using the co-ordinates x, y and z, where z represents the depth dimension. Calculating (174) position co-ordinates relative to the origin of the path taken during the dive using the water speed, depth and bearing data. Determining (176) position co-ordinates of the termination point of the dive based on the water speed, depth and bearing data. Determining (178) position co-ordinates of the termination point of the dive based on the G.P.S. receiver measurements of latitude and longitude. Calculating (180) the scaling factors that the x and y co-ordinates of the termination point determined using the water speed, depth and bearing data must be multiplied by in order to obtain the x and y co-ordinates of the termination point determined using the G.P.S. receiver measurements of latitude and longitude. An estimate of the path taken during the dive is then obtained (182) by scaling the x and y co-ordinates of the points in the path determined using the recorded water speed, depth and bearing measurements by the calculated scaling factors. The estimated path can then be output (184) in terms of latitude, longitude and depth by mapping the co-ordinates of the path from the planar co-ordinate system that was defined relative to the origin of the dive to latitude, longitude and depth co-ordinates.

Figure 12:
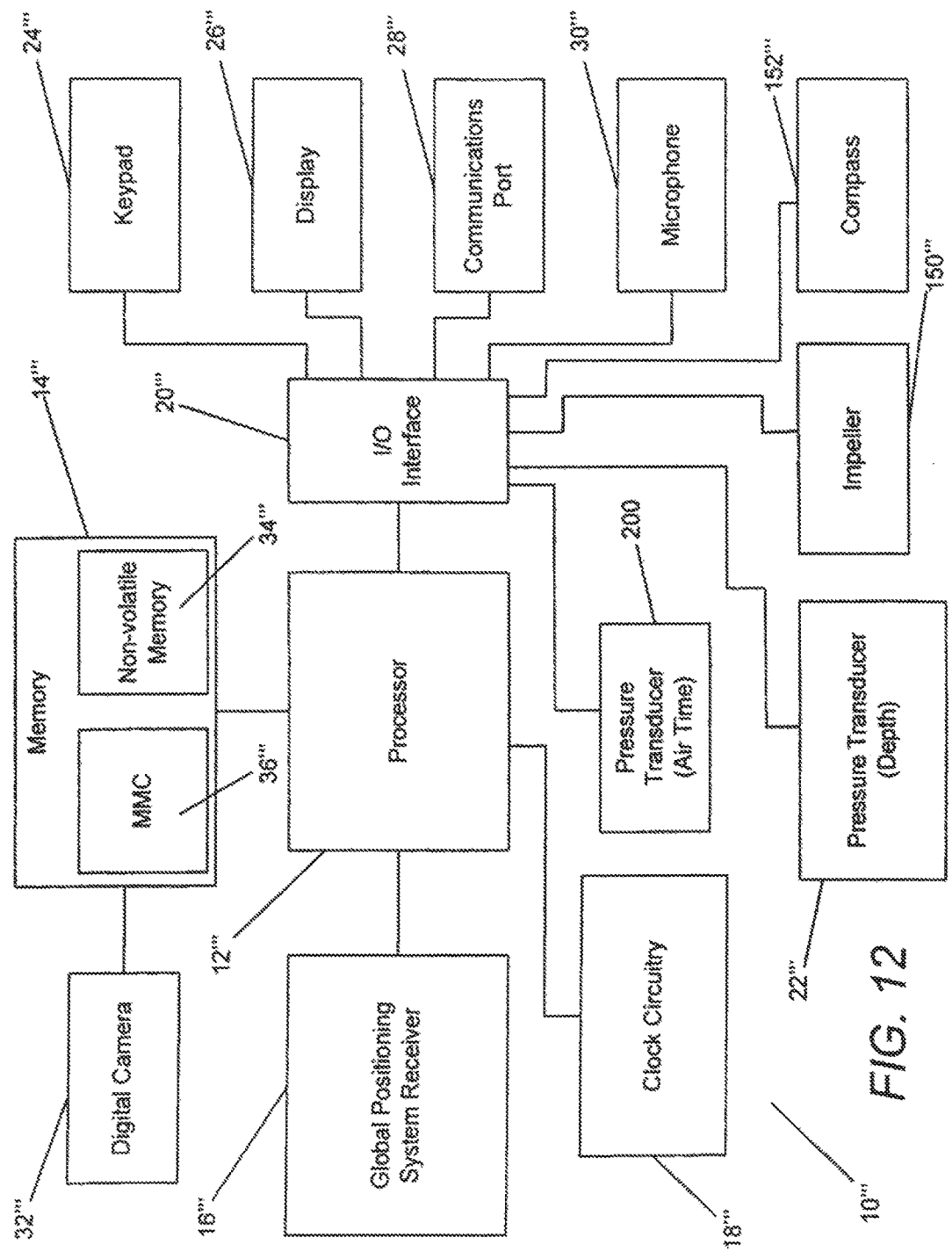
FIG. 12 is a schematic illustration of an embodiment of a dive computer in accordance with an embodiment of the invention that includes a pressure transducer for measuring air pressure in an air tank.

An embodiment of a dive computer in accordance with the present invention that incorporates pressure transducers in order to measure air time remaining is illustrated in FIG. 12. The dive computer 10" includes a pressure transducer 200 that measures air pressure inside an air tank. In one embodiment, the pressure transducer 200 is implemented using a high pressure sensor such as a 18519.A manufactured by Pelagic Pressure Systems of San Leandro, Calif. Air pressure measurements can be converted into air time remaining statistics in accordance with the methods described in U.S. Pat. No. 4,586,136 to Lewis and U.S. Pat. No. 6,543,444 to Lewis, both of which are incorporated herein by reference in its entirety.

Figure 13:
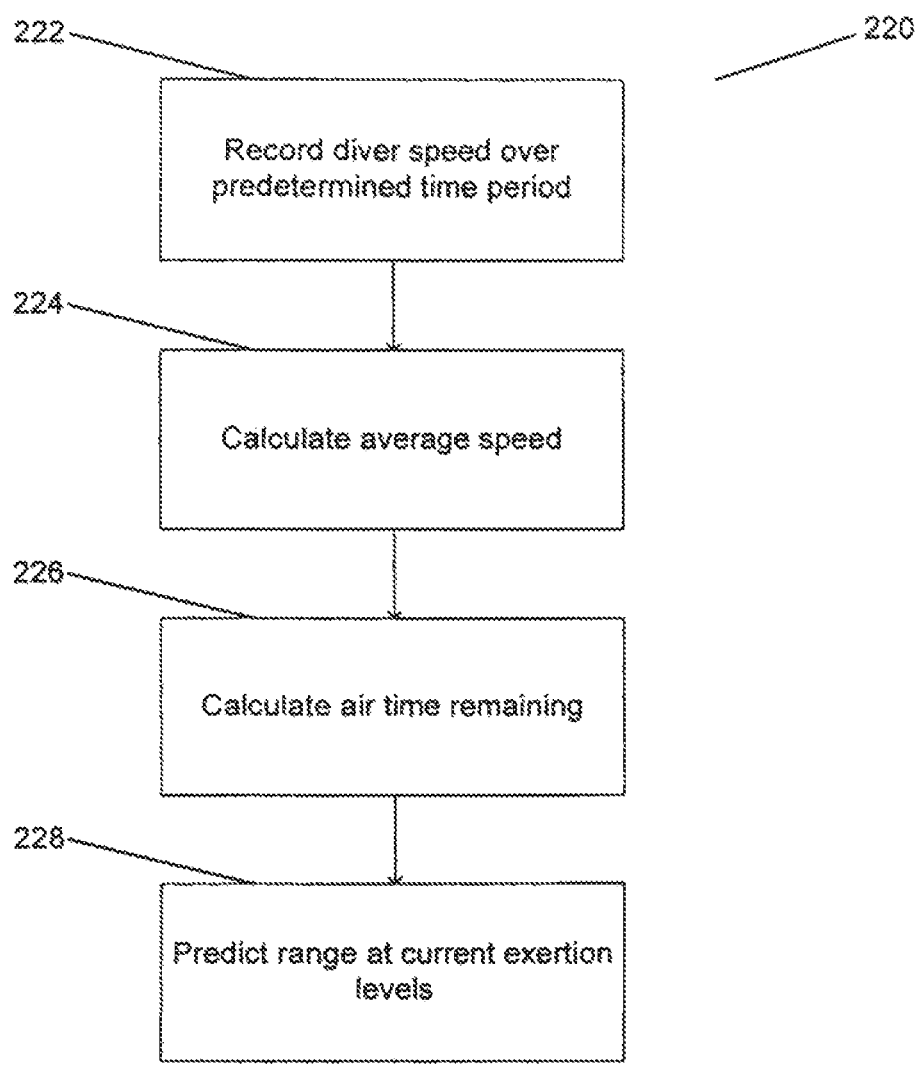
FIG. 13 is a flow chart illustrating a process for estimating the range of a diver using information concerning air time remaining and water speed.

Knowledge of the water speed of the diver and the change in air time remaining can be used to generate useful information for a diver such as an estimation of the range that a diver can travel with the air remaining in the tanks of the diver. A process for calculating an estimation of range based on the air available to a diver is illustrated in FIG. 13. The process 220 includes recording speed over a predetermined period of time (222) and then calculating the average speed during that period of time (224). Once the average speed has been calculated, the air time remaining is calculated (226). The air time remaining calculation can be used in combination with the average speed calculation to predict the range of the diver at current exertion levels. In other embodiments, the air time remaining can be adjusted to reserve sufficient air to allow the diver to return to the surface from the depth at which the diver is located without significant risk of decompression sickness.

Figure 14:
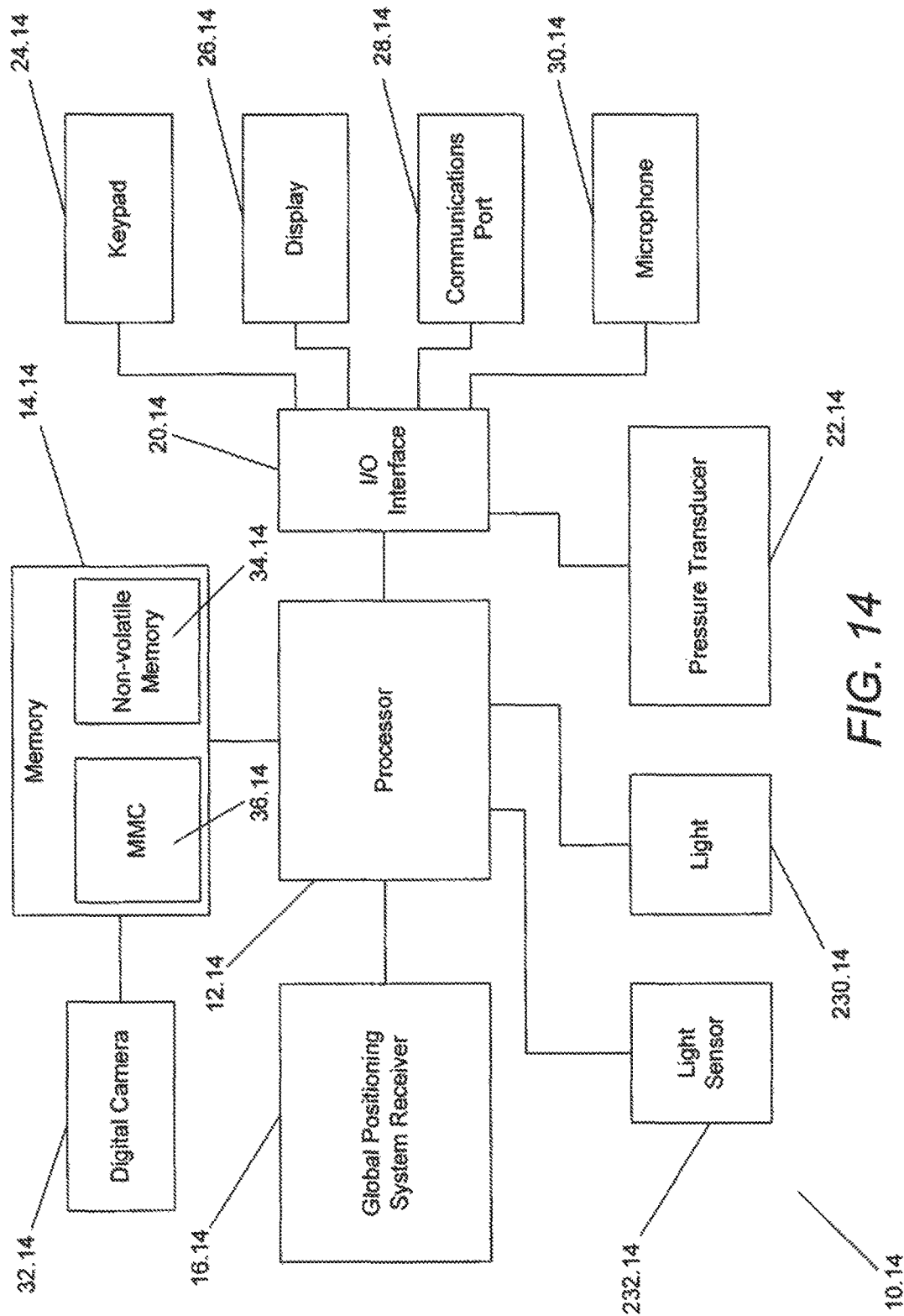
FIG. 14 is a schematic illustration of a dive computer in accordance with an embodiment of the invention that includes a light.

Underwater light levels can be low and consequently visibility can be difficult. Thus, a light can be helpful in illuminating a diver's surroundings and/or reading the dive computer. An embodiment of a dive computer in accordance with the present invention that incorporates a light is illustrated in FIG. 14. The dive computer 10.14 includes a light 230.14, a light sensor 232.14, a global positioning system (GPS) receiver 16.14, a digital camera 32.14, a memory 14.14, an input/output interface 20.14, a keypad 24.14, a display 26.14, a communications port 28.14, a microphone 30.14, a pressure transducer 22.14, and a processor 12.14. The processor is connected to the light, light sensor, GPS receiver, memory, and input/output interface. The input/output interface is connected to the keypad, display, communications port, microphone, and pressure transducer. The memory is connected to the digital camera.

In one embodiment, the light can illuminate the dive computer when the diver presses a button on the keypad and/or automatically when the light sensor indicates the need for the light. The light sensor can measure the ambient light underwater. In many embodiments, the light or a backlight illuminates the dive computer display. In several embodiments, the light includes one or more light emitting diodes (LEDs). In other embodiments, the light is configured so that the dive computer can act as a flashlight.

In many embodiments, the processor uses a signal generated by the light sensor to determine whether to activate the light. For instance, if it is dark underwater, the output generated by the light sensor is below a predetermined threshold, therefore, the processor turns the backlight on. If the signal indicates that there is a sufficient level of ambient light, then the processor can respond by keeping the backlight off and preserving the dive computer battery.

Figure 15:
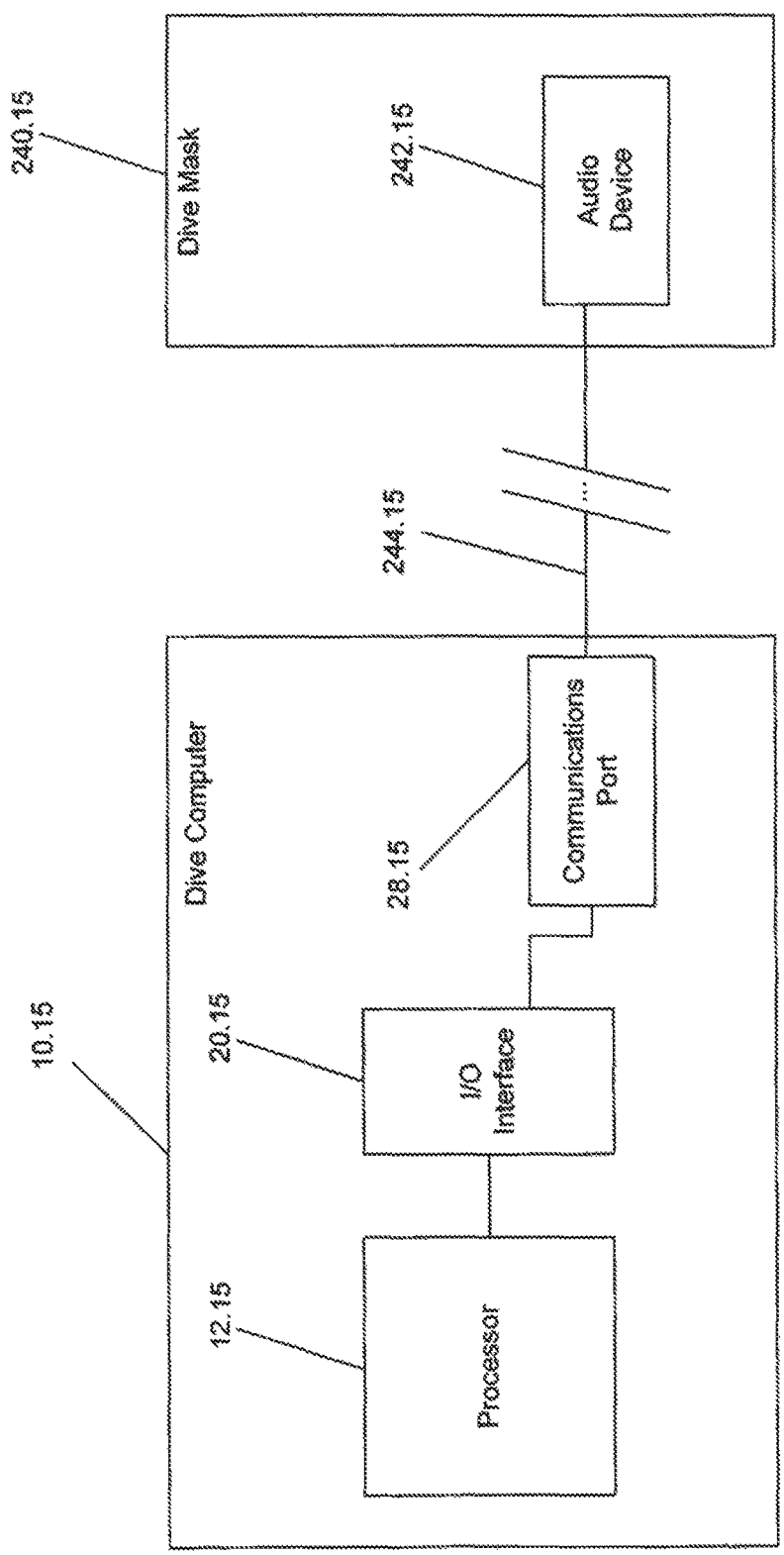
FIG. 15 is a schematic illustration of a dive computer and a dive mask with an audio device in accordance with an embodiment of the invention.

During a dive, a diver's attention is often drawn away from the display of his/her dive computer. Therefore, a period of time typically elapses between the display of a warning by a dive computer and the point in time at which the warning is observed by a diver. Examples of warnings that can be generated by a dive computer include air time remaining falling below a predetermined threshold and/or a rate of ascension that is incompatible with safe decompression. An embodiment of a dive computer and dive mask with an audio device in accordance with an embodiment of the present invention is illustrated in FIG. 15. The underwater audio system includes a dive computer 10.15, a dive mask 240.15, and a communication channel 244.15. The dive computer comprises a processor 12.15, an input/output interface 20.15, and a communications port 28.15. The dive mask 240.15 includes an audio device 242.15. The communication channel 244.15 is connected to the communications port 28.15 of the dive computer 10.15 and the audio device 242.15 within the dive mask 240.15. The input/output interface 20.15 is connected to the processor 12.15 and the communications port 28.15.

In operation, the dive computer can play audio content or sound a warning on the audio device via the communications channel. In one embodiment, the audio device can be connected to the communications port by a wire. In many embodiments, the audio device can be connected to the communications port wirelessly. In one embodiment, wireless communication can be achieved using a communication system that complies with the Bluetooth, or IEEE 802.15.1, standard. In another embodiment, wireless communication can be achieved using one or more piezoelectric devices. In yet another embodiment, the wireless communication link can be implemented using magnetic fields.

In many embodiments, the user of the dive computer can specify which warnings will be sent to the audio device by programming the dive computer. In many embodiments, the audio device can be a pair of speakers that are placed in close proximity to the users' ears within the diving mask, or earphones. In another embodiment, the audio device can be a single speaker. In several embodiments, the speakers can be located in proximity to the user's ears while outside of the diving mask. In many embodiments, the dive computer can alert the diver about low air supply, decompression requirements, or any other type of warning using the audio device. The processor can receive signals from sensors indicating tank air pressure, water pressure, time elapsed, temperature or other sensor measurements. The processor can use the received signals to determine which warnings to present to the diver. One set of warnings can be presented to the diver by default. Another set of warnings can be presented after the dive computer is programmed by the diver.

Figure 16:
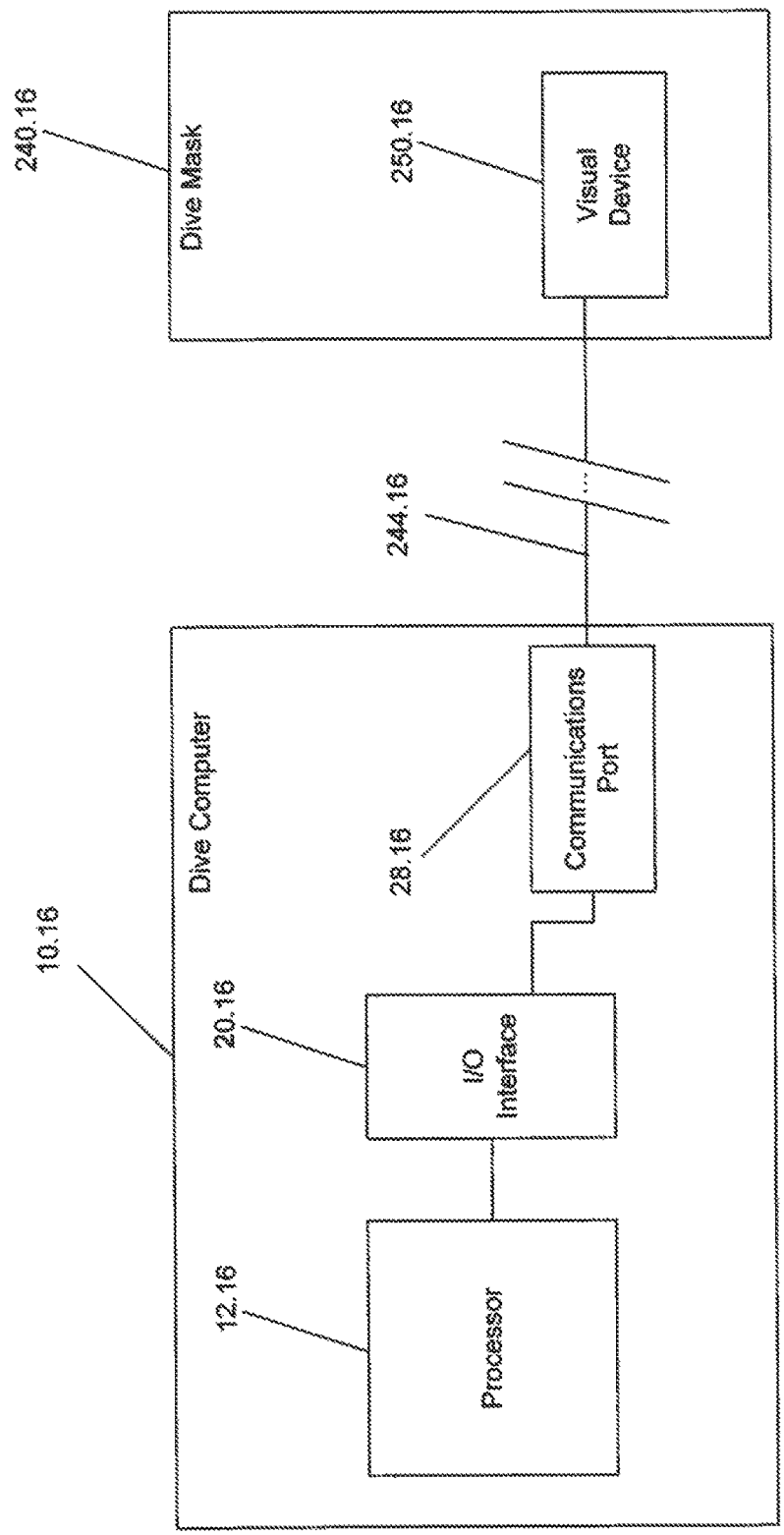
FIG. 16 is a schematic illustration of a dive computer and a dive mask with an visual device in accordance with an embodiment of the invention.

Warning indicators can also be provided to a diver visually. An embodiment of a dive computer and dive mask with a visual device in accordance with the present invention is illustrated in FIG. 16. The underwater multimedia system includes a dive computer 10.16, a dive mask 240.16, and a communications channel 244.16. The dive computer comprises a processor 12.16, an input/output interface 20.16, and a communications port 28.16. The dive mask 240.16 includes a visual device 250.16. The communication channel 244.16 is connected to the communications port 28.16 of the dive computer 10.16 and the visual device 250.16 within the dive mask 240.16. The input/output interface 20.16 is connected to the processor 12.16 and the communications port 28.16.

In operation, the dive computer can activate visual warnings on the visual device via the communications channel. In one embodiment, the visual device can be connected to the communication port by a wire. In many embodiments, the visual device can be connected to the communication port wirelessly. In one embodiment, wireless communication can be achieved using a communication system that complies with the Bluetooth, or IEEE 802.15.1, standard. In another embodiment, wireless communication can be achieved using one or more piezoelectric devices. In several embodiments, the user of the dive computer can specify which warnings will be sent to the visual device by programming the dive computer. In many embodiments, the visual device can include LEDs that are visually noticeable by the diver. In other embodiments, the visual device can be any visual indicator capable of catching the attention of the diver when activated. In many embodiments, the dive computer can alert the diver about low air supply, decompression requirements, or any other warning using the visual device.

Divers often remain at certain depths for relatively long periods of time for reasons related to decompression. As a diver is waiting, the diver may pass the time by listening to music or watching video stored on the dive computer. A dive computer with a display in accordance with an embodiment of the present invention is illustrated in FIG. 1. The dive computer 10 comprises a processor 12, a memory 14, an input/output interface 20 and a display 26, among the other items discussed with FIG. 1 above. The processor is connected to the memory and the input/output device. The input/output device is connected to the display.

In operation, the dive computer can play video content by request of the diver. In many embodiments, the memory can be loaded with audio and/or video content. The diver can direct the dive computer to play video content using the keypad. The dive computer can respond by showing the stored video on the display. The diver can also listen to the audio content associated with the video content using earphones (see discussion above). In many embodiments, the video is stored in a portion of the memory 14 that is implemented using FLASH memory and/or a hard disk drive. In several embodiments, the video is encoded in a compressed format that includes information enabling synchronization of the video with an accompanying audio track. In one embodiment, the processor is configured with software to decode the audio and/or video. In other embodiments, the video and/or audio is decoded using a decoder that is implemented in hardware.

In several embodiments, the dive computer is configured to enable a user to upload or download video or audio content to the memory. In one embodiment, content can be loaded externally on a removable memory device. The removable memory device can then be connected to the dive computer and the content accessed by a diver. In one embodiment, the memory capacity can be large enough to accommodate more than three hours of video content. Three hours of capacity can allow for storage of a movie, television show, or collection of music. In other embodiments, the memory capacity can be large enough to suit whatever storage requirements a diver might have.

In a number of embodiments, the video is stored in a format that includes information restricting access to the video and the processor 12 is configured to decode the video in accordance with digital rights granted with respect to the video. A group of embodiments store information indicative of digital rights in the memory 14. In a number of embodiments, the digital rights are stored in an encrypted form.

A user can also direct the dive computer to play audio content using the keypad. In many embodiments, the audio content is digital music. In several embodiments, the audio content is stored in a compressed format. In a number of embodiments, the audio is stored in a format that includes information restricting access to the audio, and the processor 12 is configured to decode the audio in accordance with digital rights granted with respect to the audio. A group of embodiments store information indicative of digital rights in the memory 14. In a number of embodiments, the digital rights are stored in an encrypted form.

Figure 17:
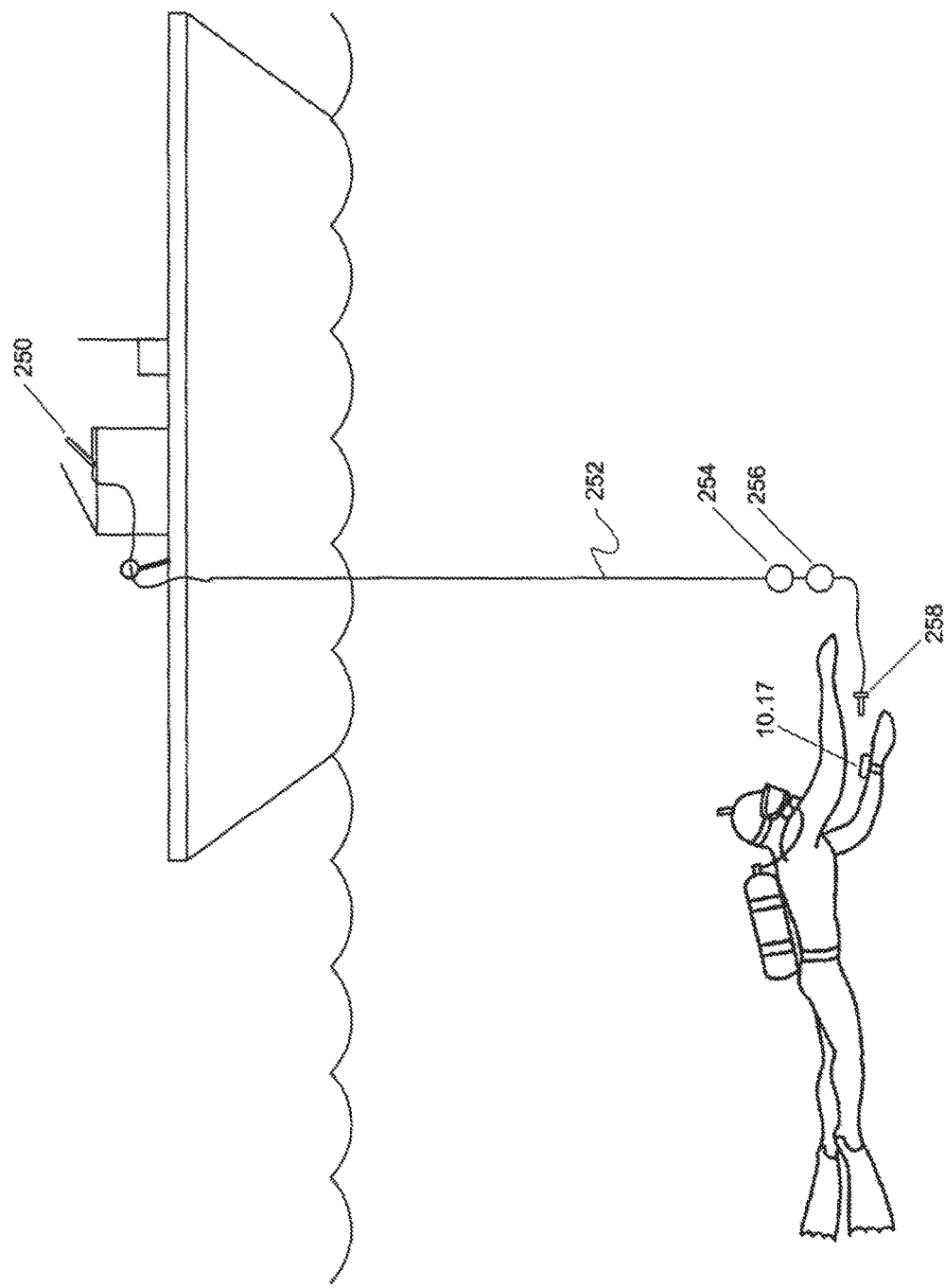
FIG. 17 is a side view of a submerged diver equipped with a dive computer configured to communicate with a communication device at the surface in accordance with an embodiment of the invention.

Often long decompression stops are required at multiple depths leaving a diver to wait underwater for hours. As such, submerged divers often have a desire to communicate with people or computers on the surface. FIG. 17 is a side view of a submerged diver equipped with a dive computer configured to communicate with a communication device at the surface in accordance with an embodiment of the present invention. The communication system includes a dive computer 10.17, a communication cable 252, and a communication device 250 located above the surface of the water. The communication cable 252 includes a light 254, a weight 256, an underwater connector 258 and a second connector (not shown) capable of being connected to a computer or other communication device above the surface. The dive computer 10.17 includes a keyboard (not shown), a communication port (not shown) capable of being connected with the underwater connector 258, and a microphone (not shown) or other communication equipment allowing the diver or dive computer the ability to communicate with a person or a communication device at the surface.

The communication cable 252 can include multiple conductors. These conductors can include serial communication conductors, power and ground. The number of and gauge of serial communication conductors can be selected to support various physical layer protocols such as RS-232, RS-422, RS-485 or other suitable serial communication system protocols. In other embodiments, parallel communication can be used over a plurality of communication conductors. In one embodiment, one or more serial communication conductors are fiber optic cables. In one embodiment, the multiple conductors carry parallel data.

In operation, the communication system allows the diver to recharge her dive computer, talk or exchange messages with people at the surface, download information, and/or minimize decompression stop time. Having power available on the communication cable 250 allows the diver to recharge her dive computer battery and provides a stable power source in the event the dive computer battery is exhausted. This can prove useful in emergency situations where the dive computer battery is dead and the diver needs to know how to execute her decompression stops.

The power can be supplied at a level appropriate to support the light, one or more dive computers and communication from the dive computers to communication devices at the surface. The weight 256 ensures maximum depth of the lower end of the communication cable when it is lowered into the water. The light 254 provides a beacon for the diver to find the communication cable in the event that she has not already connected her dive computer to the communication cable. In one embodiment, the light 254 can be any number of colors suitable to get the diver's attention in a dark underwater environment. In another embodiment, the light 254 can be a flashing light to further attract a diver's attention to the communication cable. In other embodiments, other types of beacons can be used such as sonar or magnetic beacons. In one embodiment, the communication cable does not include power. In such case, the light 254 can be powered by a battery.

The diver can also use the microphone, keyboard or other input device attached to her dive computer to communicate with people via the communication device 250 at the surface. In the illustrated embodiment, the communication device at the surface is a computer. In this case, the communication can be achieved using two-way audio, text messages or some other communication method. Using the keyboard, microphone or other input device, the diver can send details about her dive to people at the surface. In one embodiment, the diver instructs the dive computer to send data concerning her recent dive (dive log) to the surface. In this case, the information may be processed and analyzed at the surface before the diver returns to the surface. In one embodiment, the diver discusses events or issues related to the dive with medical or dive support personnel at the surface. In this case, the diver can engage in the discussion using the two-way audio communication or by exchanging text messages. Audio communication over the communication cable can be implemented either by transmission of the analog audio or transmission of a digital representation of the audio using methods known to one skilled in the art.

The computer at the surface can use the dive log information to calculate the duration and depth of any required decompression stops. In this case, the surface computer can be more powerful or have more information than the dive computer carried by the diver allowing it to make a more precise calculation of the required decompression stops. This calculation by the surface computer can be relayed to the dive computer below. In this way, the calculation made possible by the communication system can save the diver from waiting at decompression stops for more time than necessary. Correspondingly, the surface calculation can ensure that the diver stays at her decompression stops for at least the required decompression time.

In one embodiment, the dive computer downloads audio content from the surface computer. In this way, the diver can listen to music, news or other audio content while underwater. More specifically, the diver can access this content while ascending or making a decompression stop. In another embodiment, the dive computer downloads video content or receives a video stream and/or audio stream from the surface computer. In this way the diver can watch a movie, television or other audiovisual content while underwater. More specifically, the diver can access this content while ascending or making a decompression stop.

Figure 18:
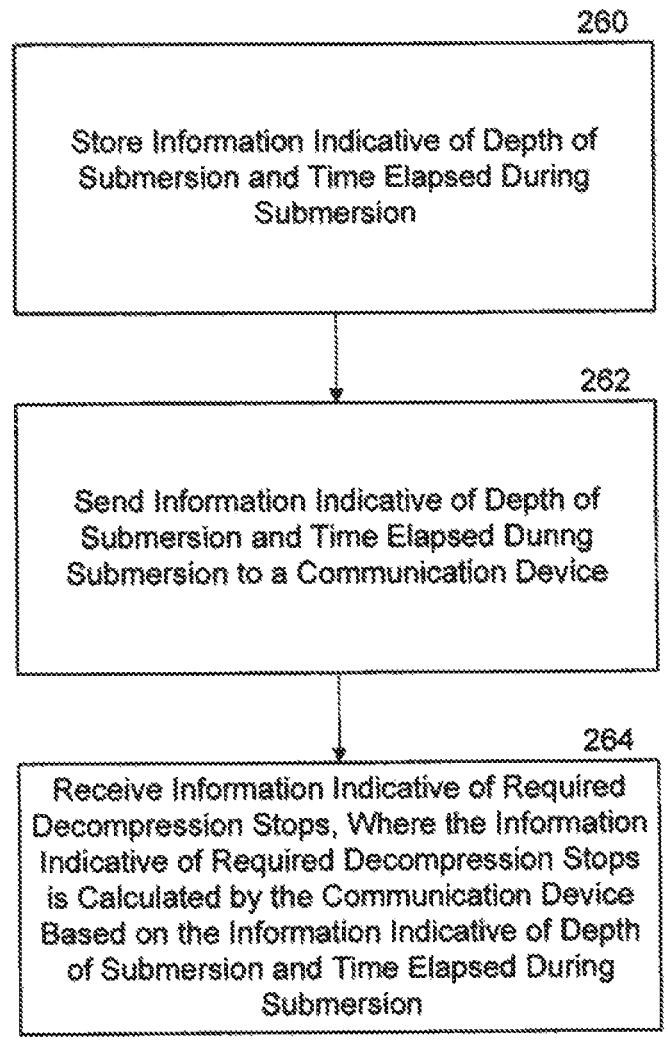
FIG. 18 is a flow chart illustrating a method of communication between a dive computer and a communication device at the surface in accordance with an embodiment of the invention.

A flow chart illustrating a method of communication between a dive computer and a communication device at the surface in accordance with an embodiment of the invention is shown in FIG. 18. The process first stores (260) information indicative of the depth of submersion and the time elapsed during submersion. Once such information is stored, the process sends (262) the information indicative of the depth of submersion and the time elapsed during submersion to a communication device via a cable including an underwater connector. Once the information is sent to the communication device, the process receives (264) information indicative of required decompression stops, where the information indicative of required decompression stops is calculated by the communication device based on the information indicative of depth of submersion and time elapsed during submersion.

Figure 19:
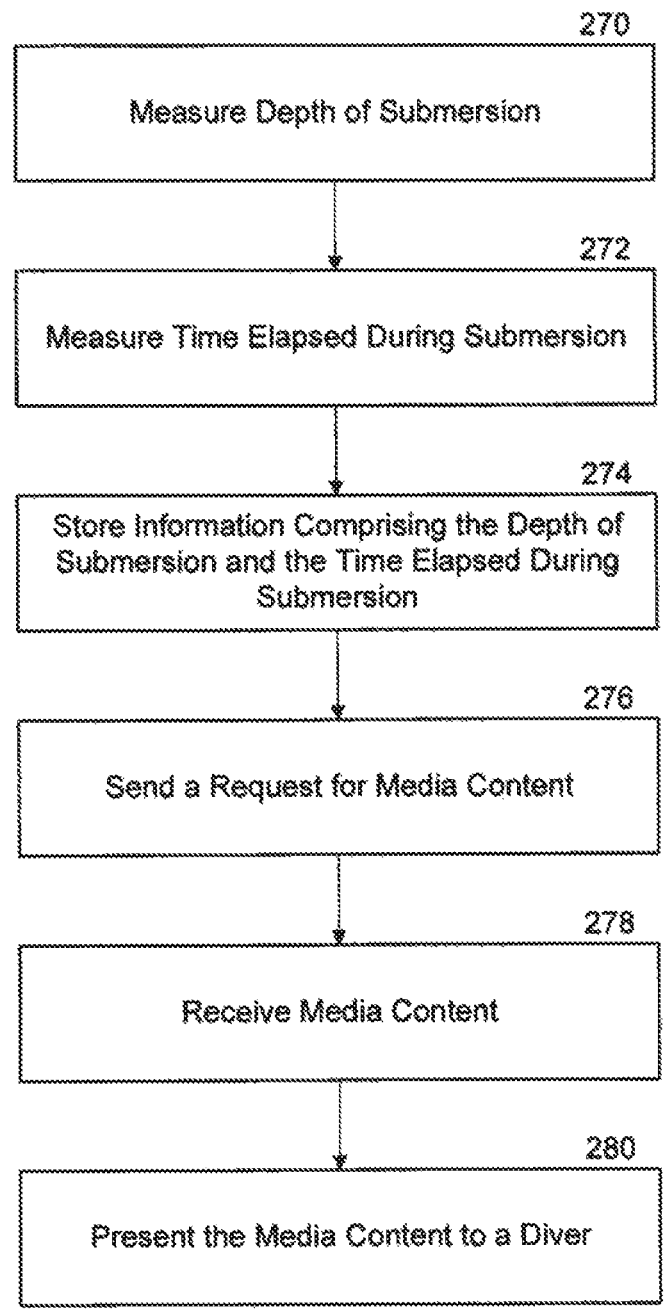
FIG. 19 is a flow chart illustrating a method of communication for a dive computer in accordance with an embodiment of the invention.

A flow chart illustrating a method of communication for a dive computer in accordance with an embodiment of the invention is shown in FIG. 19. The process first measures (270) the depth of submersion and measures (272) the time elapsed during submersion. Once the values are measured, the process stores (274) information including the depth of submersion and the time elapsed during submersion. Once the values are stored, the process sends (276) a request for media content. Once the request is sent, the process receives (278) media content. Once received, the process presents (280) the media content to a diver.

Figure 20:
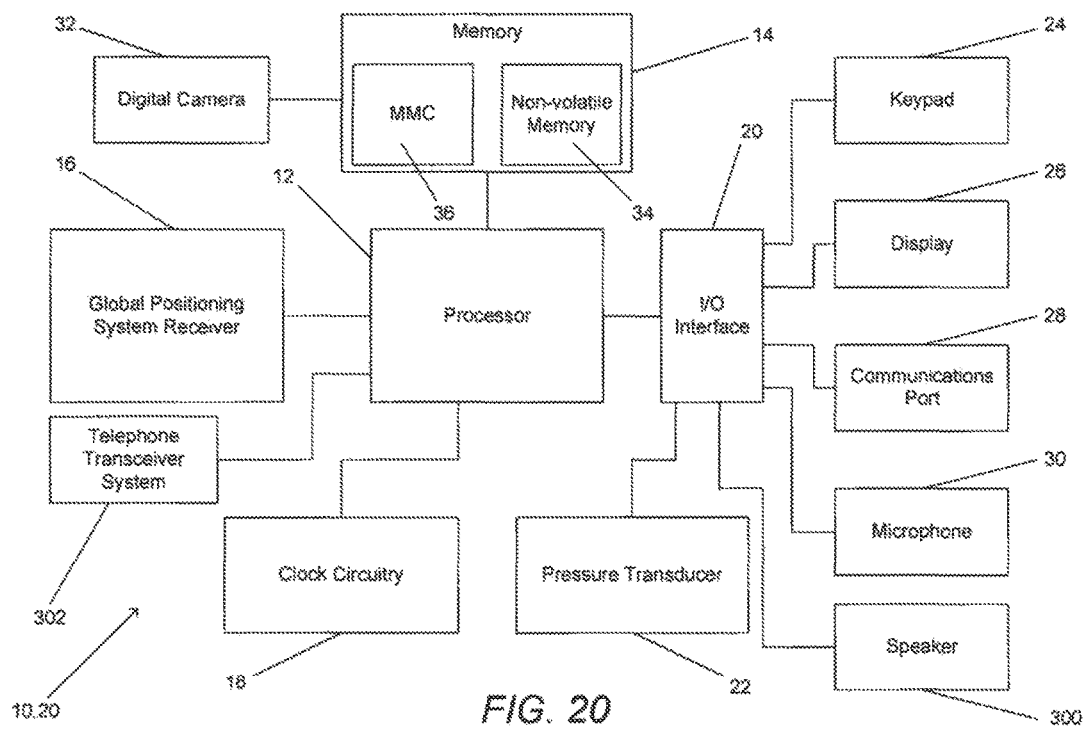
FIG. 20 is a schematic illustration of a dive computer including a microphone, speaker and telephone antenna in accordance with an embodiment of the invention.

Another dive computer in accordance with an embodiment of the invention is shown in FIG. 20. The dive computer 10.20 is similar to the dive computer 10 shown in FIG. 1 with the exception that the dive computer 10.20 includes a microphone 30, speaker 300 and telephone transceiver system 302 that enable the dive computer to act as a telephone handset. In the illustrated embodiment, the microphone 30 and speaker 300 are connected to the processor 12 via an I/O interface 20 and the telephone transceiver system 302 is directly connected to the processor 12. In other embodiments, other configurations of microphones, speakers, telephone transceiver systems and processors are contemplated that enable the dive computer to be used to make telephone calls via a predetermined telephone network. In a number of embodiments, the dive computer communicates via a cell phone network such as a D-AMPS, CDMA2000 and/or a GSM network. In other embodiments, the dive computer is configured to communicate via a satellite telephone network and/or make emergency calls via any of a number of different communication technologies including a satellite telephone network. In several embodiments, the emergency call includes a digital message containing the device's current GPS coordinates. In many embodiments, the dive computer acts as an emergency beacon broadcastings its GPS coordinates on an emergency channel. The circuitry of a dive computer in accordance with an embodiment of the invention can be configured in a manner appropriate to the network over which the dive computer can communicate and other circuitry incorporated into the dive computer to enable additional functionality. Examples of such additional circuitry are described above. In many embodiments, the dive computer includes a keypad enabling the transmission of text messages and email communications from the dive computer via the telephone network. In a number of embodiments, the dive computer includes a display and the dive computer is configured to display digital information such as web pages, games, email and other digital information received via the telephone network to which the dive computer can connect in addition to information typically associated with a dive computer. In several embodiments, the information received via the telephone network can be stored on the dive computer. Examples of such information can include audio files containing music and multimedia files containing audiovisual presentations.

A dive computer in accordance with embodiments of the invention can be implemented using a standard mobile phone handset as the basic platform. Smart phones such as the 3G iPhone manufacture by Apple Inc. of Cupertino, Calif. include a microprocessor, an operating system, a telephone transceiver, a GPS receiver, an external connector, and the ability to download applications to the mobile phone handset. When a pressure transducer is connected to the smart phone, a software application installed on the smart phone can perform all of the basic functions of a dive computer. In addition, the software application can generate a dive log tying in information captured using the pressure transducer with information captured by components of the mobile phone handset, such as GPS coordinates acquired using the GPS receiver, accelerometer information for performing dead reckoning, images from a camera, and/or audio recordings. The data capabilities of the mobile phone handset also enable the software application to download information concerning the dive site and upload information captured during the dive, such as a dive log, to a remote server. The multimedia capabilities of the mobile handset also enable the dive computer assembly to act as a media player. During sustained decompression stops, the media player capabilities of the mobile phone handset can be utilized to view video or listen to audio while the dive computer application is executing in the background to monitor decompression time. In many embodiments, the dive computer application is configured to interrupt the media player with alerts and/or to notify the diver of the completion of a decompression stop. In order for the mobile phone handset to survive in an underwater environment, the mobile phone handset and the pressure transducer are typically contained within a waterproof housing. Examples of suitable waterproof housings are described in U.S. Pat. No. 6,396,769 to Polani, and U.S. Patent Publication 2007/0086273 to Polani et al., the disclosure of which is incorporated by reference herein in its entirety. In many embodiments, a combination of external sensors and communication devices are connected to the mobile phone handset including communication devices that enable wireless communication with other sensors. In a number of embodiments, information is collected from a pressure transducer connected to a diver's air tank and the information is used to perform airtime remaining calculations.

Although the foregoing embodiments are disclosed as typical, it will be understood that additional variations, substitutions and modifications can be made to the system, as disclosed, without departing from the scope of the invention. For example, embodiments of the invention can have G.P.S. receivers adapted to be submerged in water that are not connected to the processor. These embodiments log latitude, longitude and time information using the G.P.S. receiver and separately log depth and time information using a dive computer. The latitude, longitude and time information from the G.P.S. receiver and the depth and time information from the dive computer can be downloaded to the dive computer or another computer and the methods described above can be used to determine position. In addition, dive computers in accordance with the present invention can perform functions performed by conventional dive computers such as providing divers with information concerning decompression limits or the amount of air remaining in a tank, however, it is not a limitation of the invention that the dive computer perform these functions or other functions typically associated with conventional dive computers. Other functions can also be performed by the dive computer that are not traditionally associated with dive computers such as functions normally attributed to personal digital assistants (P.D.A.s) or other more powerful computing devices. In addition, dive computers in accordance with the present invention may consist of a conventional dive computer and a microphone and/or a digital camera and do not require the inclusion of a G.P.S. receiver. Other embodiments of dive computers in accordance with the present invention may also combine several of the features described above such as a buoy including a G.P.S. antenna, a compass and an impeller. In one embodiment, the dive computer has a light powered by a solar cell. In a similar embodiment, the dive computer has batteries that are recharged using a solar cell. In exemplary embodiments, the intensity of the dive computer backlight can be adjusted by the diver. In one embodiment, the audio warning can be a high pitched chirping sound. In another embodiment, the audio warning can be a constant high pitched sound. In one embodiment, the video warning can be a powerful repeating flash. In one embodiment, the dive computer can be configured to operate in conjunction with online video and audio content providers. In one embodiment, the dive computer can also include a receiver configured to receive emergency broadcasts. In several embodiments, the playback of audio and video content or activation of the backlight can be initiated using speech recognition and voice commands. Thus the present invention has been described by way of illustration and not limitation.

What is claimed is:
1. A dive computer comprising:
a processor;
a display in communication with the processor;
a communications port in communication with the processor;
a temperature sensor in communication with the processor;

a pressure sensor in communication with the processor; and clock circuitry in communication with the processor;

wherein the processor:
- determines time and date using the clock circuitry;
- determines depth of submersion using the pressure sensor;
- determines water temperature using the temperature sensor;
- calculates at least one decompression stop based on the determined time and depth of submersion;
- displays elapsed dive time using the display during a dive, where the elapsed dive time is calculated based on the time determined using the clock circuitry when the dive computer is underwater;
- displays the water temperature determined using the temperature sensor:
- generates a warning in response to unsafe conditions;
- combines depth information and time information into a dive log;
- provides the dive log using the display; and
- transmits the dive log to an external device using the communications port;

wherein the depth information comprises the maximum depth reached during the dive;

wherein the time information comprises the duration of the dive and the date of the dive; and wherein the temperature information comprises the temperature of the water during the dive.

2. The dive computer of claim 1, wherein:
the dive computer comprises an audio device capable of playing back audio data;
the warning comprises audio data; and
the processor further plays back the warning using the audio device.

3. The dive computer of claim 1, wherein:
the warning comprises visual data; and
the processor further displays the warning using the display.

4. The dive computer of claim 1, wherein the processor displays a rate of ascent during a dive using the display.

5. The dive computer of claim 1, wherein calculating decompression stops comprises:
determining the depth of at least one decompression stop; and
determining the time to remain at the at least one decompression stop.

6. The dive computer of claim 5, wherein the processor generates a warning when the time to remain at the at least one decompression stop is zero.

7. The dive computer of claim 1, wherein the processor further:
determines air temperature using the temperature sensor;
displays the air temperature using the display; and
stores the air temperature in the dive log.

8. The dive computer of claim 1, wherein:
the processor is further connected to an air tank pressure transducer; and
the processor further:
obtains air tank pressure from the air tank pressure transducer; and
generates a warning when the air tank pressure is below a threshold value.

9. The dive computer of claim 1, wherein the processor generates a warning in response to the depth of submersion reaching an unsafe value.

10. The dive computer of claim 1, wherein the processor generates a warning in response to the water temperature reaching an unsafe value.

11. The dive computer of claim 1, wherein the processor generates a warning in response to the elapsed dive time reaches an unsafe value.

12. The dive computer of claim 1, wherein:
the dive computer further comprises an input device connected to the processor; and
the processor changes which information is displayed in response to a user input received using the input device.

13. The dive computer of claim 12, wherein the processor further changes which warnings are displayed in response to a user input to the input device.

14. The dive computer of claim 1, wherein the communications port comprises a wireless transceiver.

15. The dive computer of claim 14, wherein the wireless transceiver complies with the Bluetooth standard.

16. The dive computer of claim 1, wherein the communications port comprises a connector, and wherein a wire can be connected to the connector.

17. The dive computer of claim 1, wherein the dive log further comprises a measurement of time at a particular depth measured by the pressure transducer.

18. The dive computer of claim 1, wherein the display comprises a backlight.

19. The dive computer of claim 18, wherein the backlight comprises at least one light emitting diode.

20. The dive computer of claim 1, wherein the display comprises at least one liquid crystal display segment.

* * * * *